US009033673B2

(12) United States Patent
Roussille et al.

(10) Patent No.: US 9,033,673 B2
(45) Date of Patent: *May 19, 2015

(54) TURBOMACHINE BLADE OR VANE HAVING COMPLEMENTARY ASYMMETRICAL GEOMETRY

(75) Inventors: Clément Roussille, Bordeaux (FR); Julien Mateo, Carignan de Bordeaux (FR); Antoine Jean-Philippe Beaujard, Moissy-Cramayel (FR); Elric Georges André Fremont, Merignac (FR)

(73) Assignees: Herakles, Le Haillan (FR); Snecma, Paris (FR)

( * ) Notice: Subject to any disclaimer, the term of this patent is extended or adjusted under 35 U.S.C. 154(b) by 323 days.

This patent is subject to a terminal disclaimer.

(21) Appl. No.: 13/607,131

(22) Filed: Sep. 7, 2012

(65) Prior Publication Data
US 2013/0101429 A1 Apr. 25, 2013

Related U.S. Application Data

(63) Continuation-in-part of application No. PCT/FR2011/051431, filed on Jun. 22, 2011.

(30) Foreign Application Priority Data

Jun. 28, 2010 (FR) ...................................... 10 55161
Sep. 7, 2011 (FR) ...................................... 11 57925

(51) Int. Cl.
*F01D 5/28* (2006.01)
*F01D 5/14* (2006.01)
(Continued)

(52) U.S. Cl.
CPC ................. *F01D 5/147* (2013.01); *B29C 70/00* (2013.01); *F01D 5/225* (2013.01); *F01D 5/282* (2013.01); *F05D 2300/6033* (2013.01); *Y02T 50/672* (2013.01); *Y02T 50/673* (2013.01)

(58) Field of Classification Search
CPC ............. F01D 5/00; F01D 5/282; F01D 9/02; F01D 25/00; F05D 2300/603
USPC ............... 29/889.71; 416/229 R, 230, 241 A, 416/241 B, 241 R
See application file for complete search history.

(56) References Cited

U.S. PATENT DOCUMENTS

| 4,195,396 | A | * | 4/1980 | Blazek ........................... 29/889 |
| 6,196,794 | B1 | * | 3/2001 | Matsumoto ................... 415/191 |

(Continued)

FOREIGN PATENT DOCUMENTS

| EP | 1 607 581 A1 | 12/2005 |
| FR | 2 664 518 A1 | 1/1992 |

(Continued)

OTHER PUBLICATIONS

U.S. Appl. No. 13/515,879, filed Jun. 14, 2012, Nunez, et al.
(Continued)

*Primary Examiner* — Nathaniel Wiehe
*Assistant Examiner* — Woody A Lee, Jr.
(74) *Attorney, Agent, or Firm* — Oblon, McClelland, Maier & Neustadt, L.L.P.

(57) ABSTRACT

A turbomachine blade or vane is made of composite material including fiber reinforcement obtained by three-dimensional weaving of yarns and densified by a matrix. The blade or vane includes a first portion constituting at least an airfoil exhibiting two faces each connecting a leading edge to a trailing edge, the first portion forming a single part with at least one second portion present only on one of the faces of the airfoil, the second portion constituting a portion of at least one of the following elements: a flowpath delimiting outer portion of an inner platform, an inner portion of an inner platform, a flowpath delimiting inner portion of an outer platform, and an outer portion of an outer platform, the portions of the fiber reinforcement corresponding to the first and the second portions of the blade being at least partially mutually imbricated, with yarns of the first portion of the fiber reinforcement penetrating into the second portion of the fiber reinforcement.

31 Claims, 20 Drawing Sheets

(51) Int. Cl.
*B29C 70/00* (2006.01)
*F01D 5/22* (2006.01)

(56) References Cited

U.S. PATENT DOCUMENTS

| | | | |
|---|---|---|---|
| 6,227,798 B1 | 5/2001 | Demers et al. | |
| 6,627,019 B2 * | 9/2003 | Jarmon et al. | 156/89.11 |
| 6,676,373 B2 * | 1/2004 | Marlin et al. | 415/191 |
| 7,241,112 B2 * | 7/2007 | Dambrine et al. | 415/230 |
| 2003/0185673 A1 | 10/2003 | Matsumoto et al. | |
| 2007/0154318 A1 | 7/2007 | Saltman et al. | |
| 2011/0311368 A1 | 12/2011 | Coupe et al. | |
| 2012/0055609 A1 | 3/2012 | Blanchard et al. | |

FOREIGN PATENT DOCUMENTS

| | | | |
|---|---|---|---|
| FR | 2 745 808 | A1 | 9/1997 |
| FR | 2 939 129 | A1 | 6/2010 |
| WO | 2010/061140 | A1 | 6/2010 |
| WO | 2010/116066 | A1 | 10/2010 |
| WO | 2011/080443 | A1 | 7/2011 |

OTHER PUBLICATIONS

U.S. Appl. No. 13/606,935, filed Sep. 7, 2012, Roussille, et al.
U.S. Appl. No. 13/607,371, filed Sep. 7, 2012, Nunez, et al.
U.S. Appl. No. 13/607,341, filed Sep. 7, 2012, Coupe, et al.
International Search Report mailed on Oct. 25, 2011, issued for International Application No. PCT/FR2011/051431, filed on Jun. 22, 2011 (English).
French Search Report mailed on May 2, 2012, issued for French Application No. 1157925, filed on Sep. 7, 2011 (With English translation of Categories).

* cited by examiner

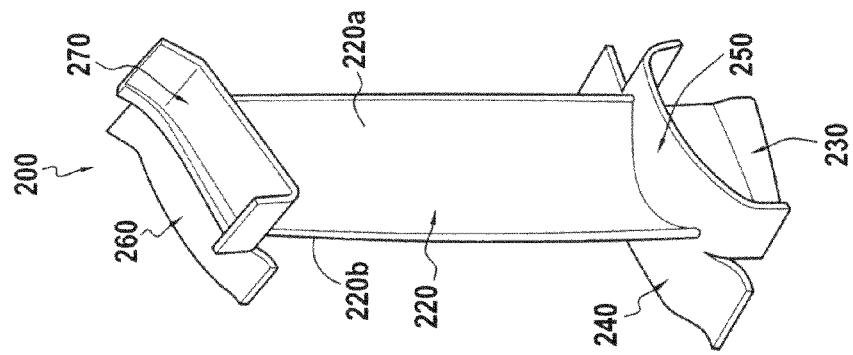
FIG.6
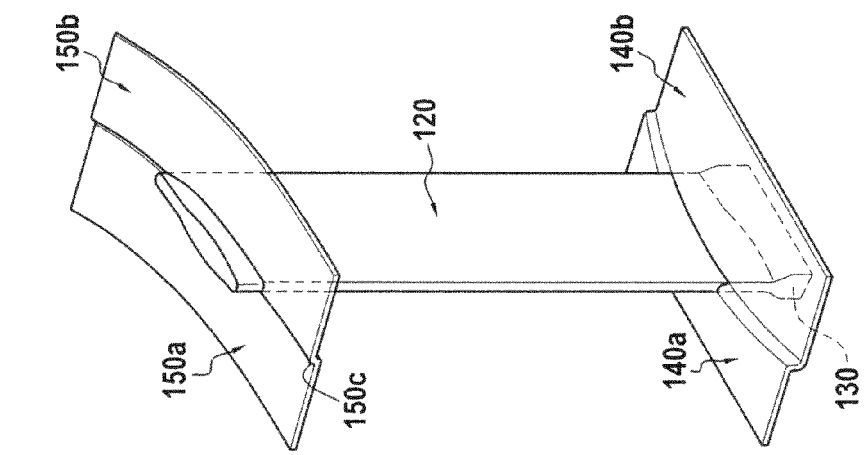
FIG.5
FIG.4
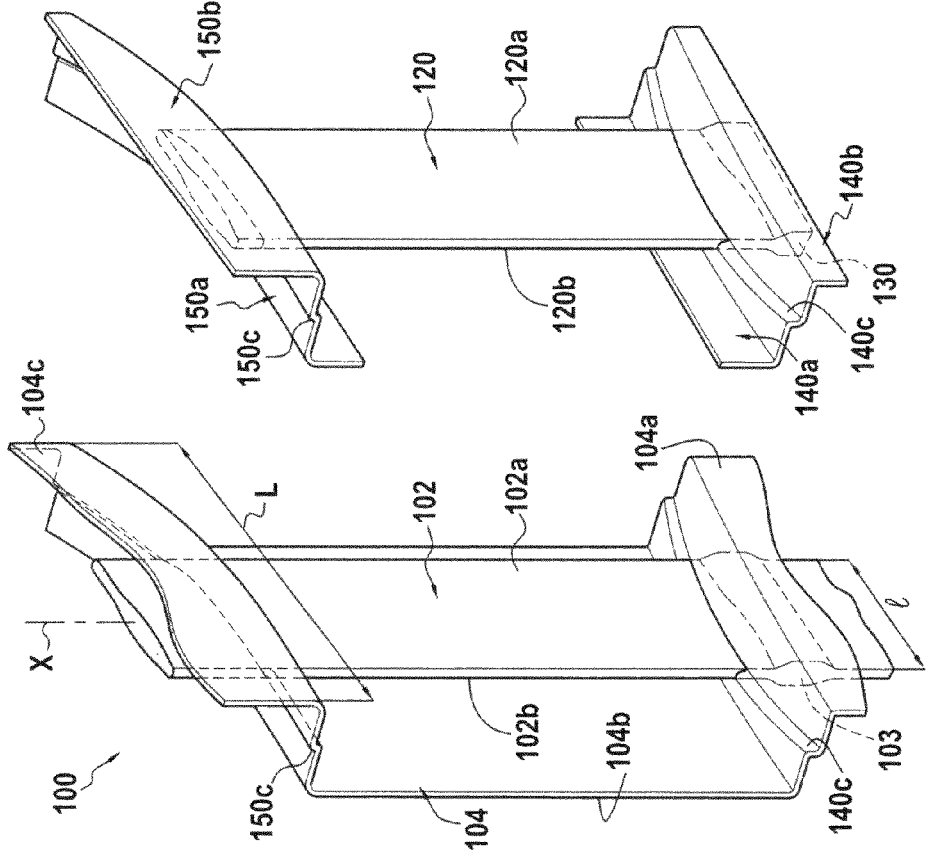
FIG.3

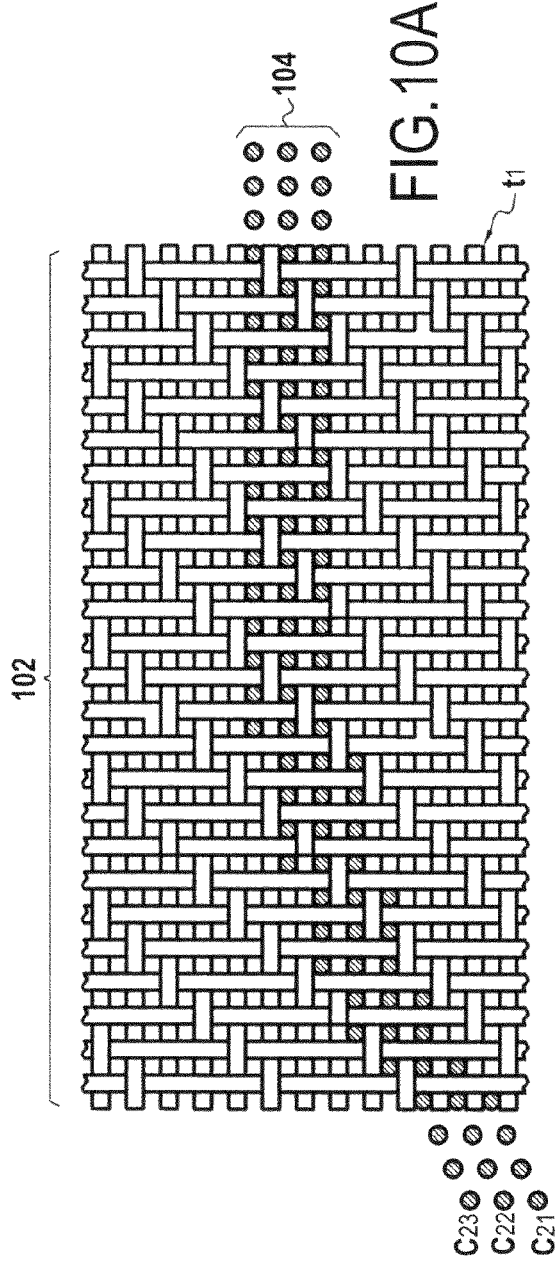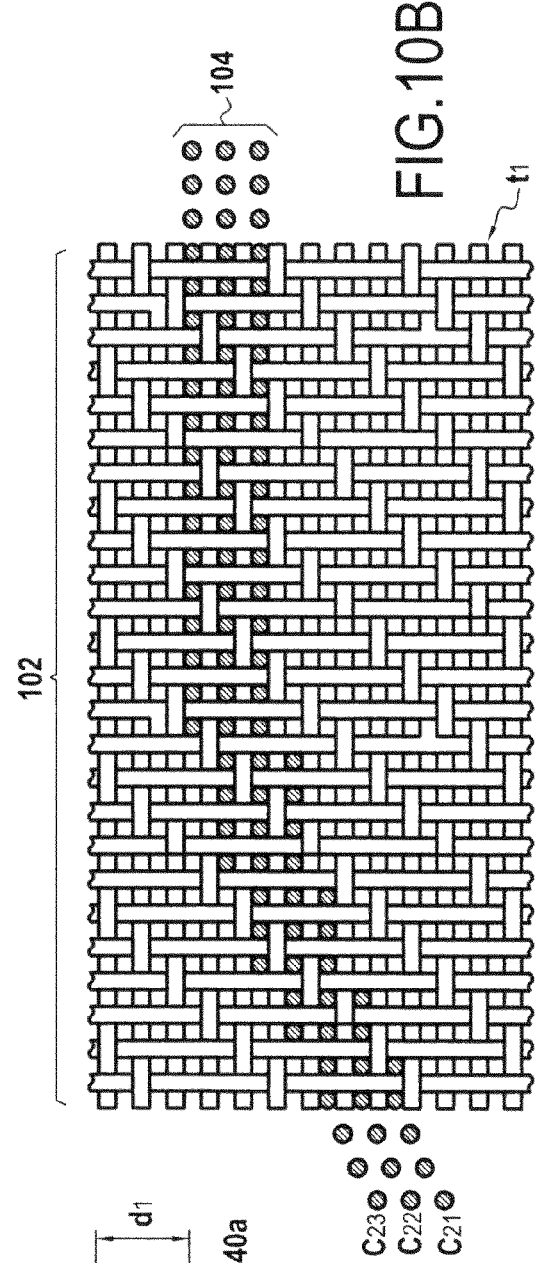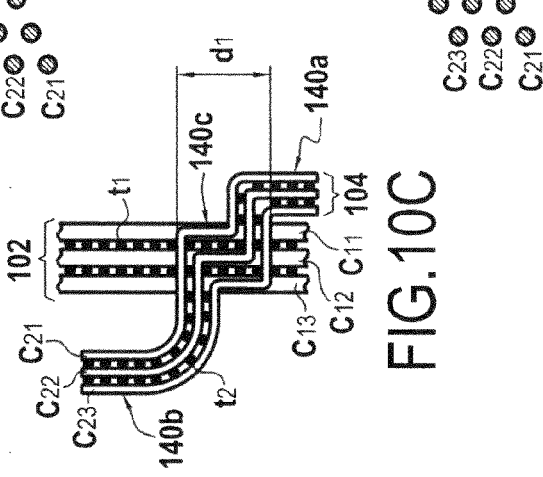

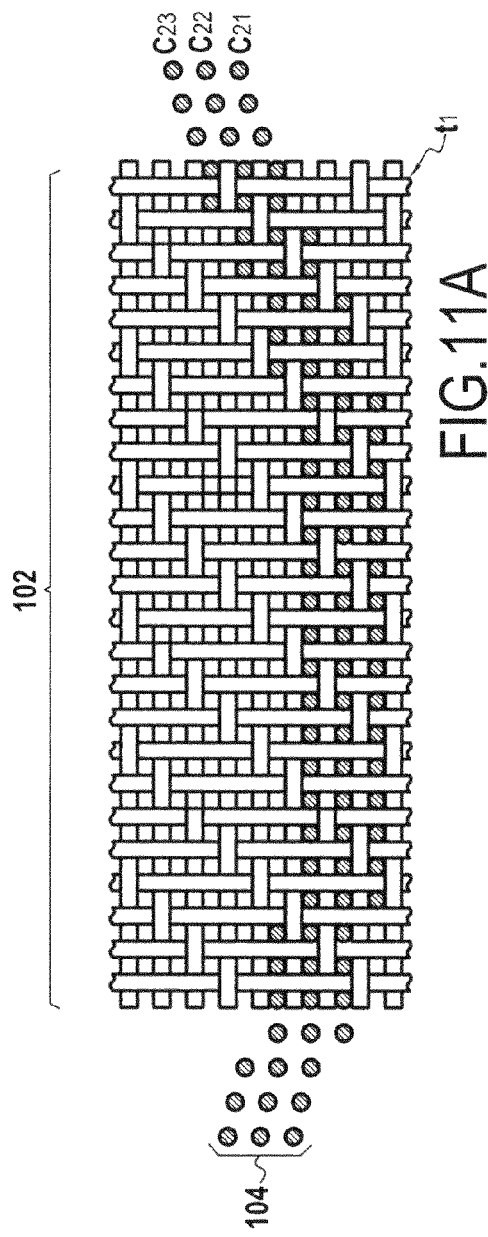
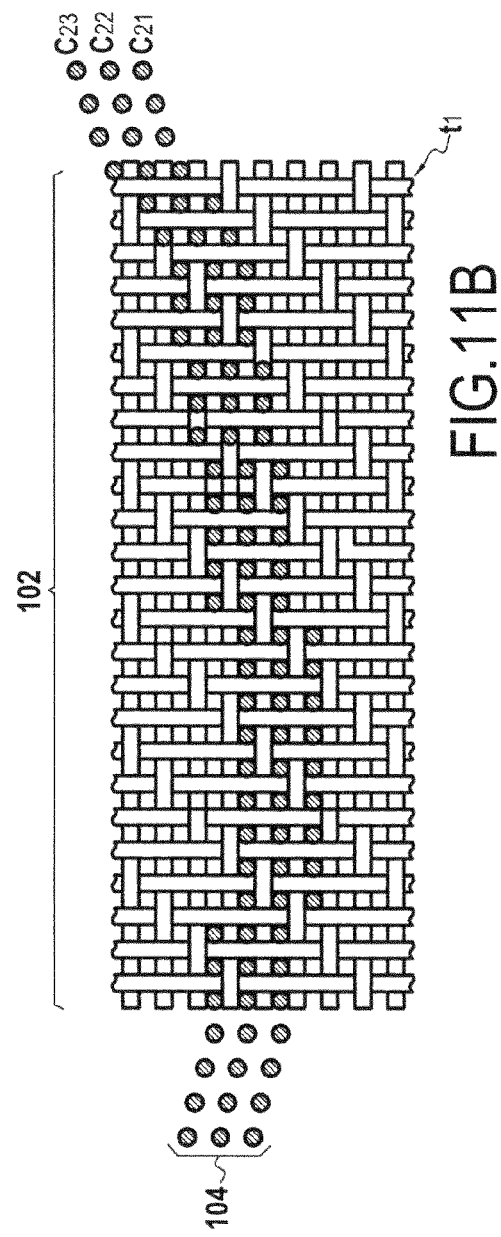
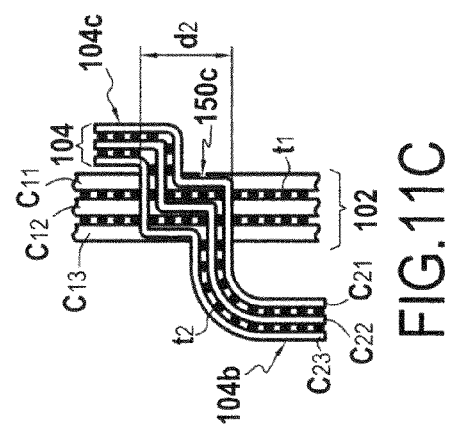

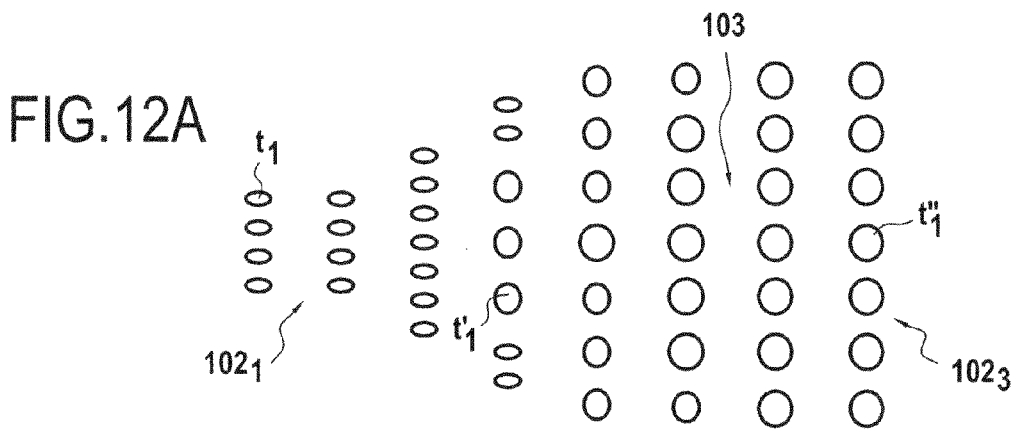
FIG.12A
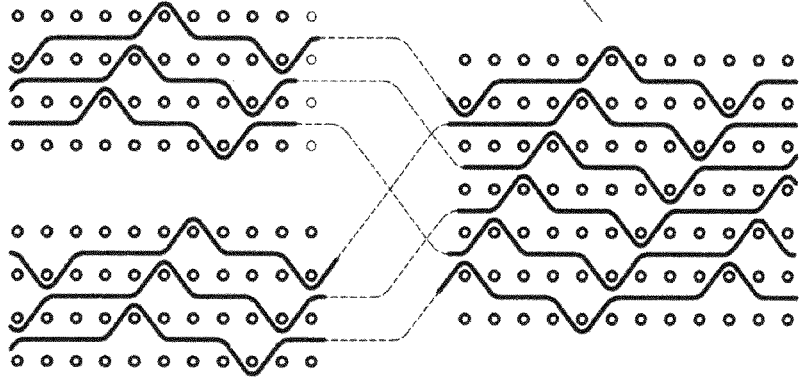
FIG.12B
FIG.12C
FIG.12D
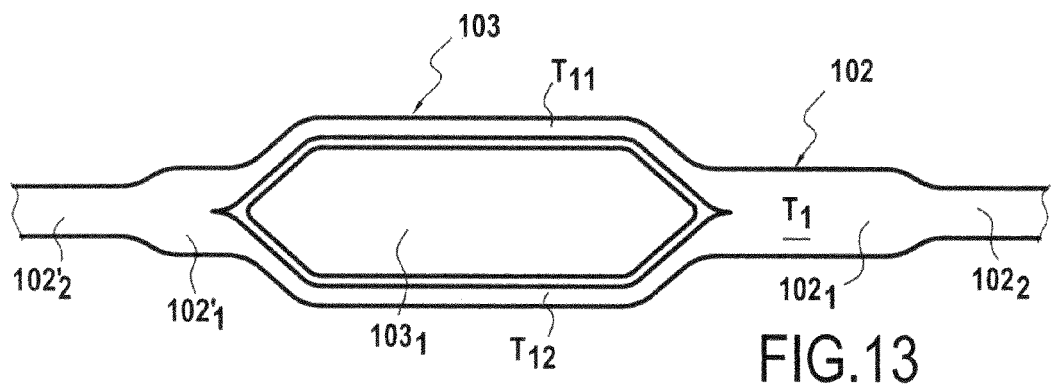
FIG.13

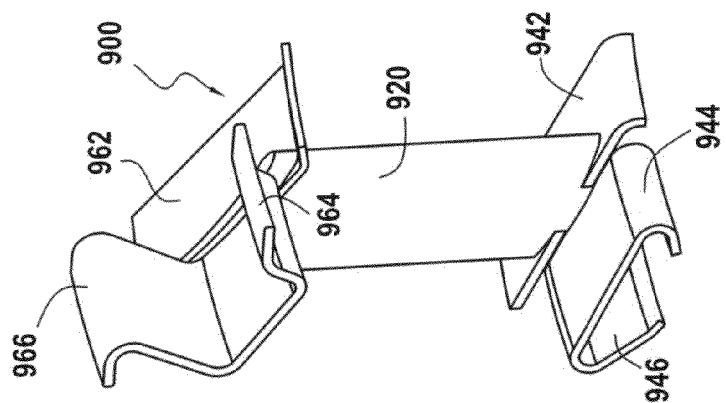
FIG.21
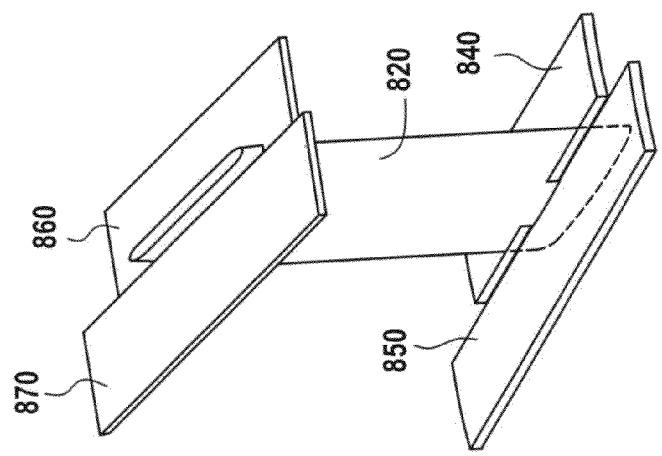
FIG.22
FIG.23
FIG.24

TURBOMACHINE BLADE OR VANE HAVING COMPLEMENTARY ASYMMETRICAL GEOMETRY

RELATED APPLICATIONS

The present application is a Continuation-in-Part Application based on PCT Application PCT/FR2011/051431 claiming priority of French Patent Application No 1055161 filed on Jun. 28, 2010 and incorporates subject matter derived from French Patent Application No 1157925 filed on Sep. 7, 2011, of which priority is also claimed.

BACKGROUND OF THE INVENTION

The invention relates to turbomachine blades or vanes made of composite material comprising fiber reinforcement densified by a matrix. The invention relates also to compressor stator segments and turbine nozzle segments incorporating such composite material vanes.

The intended field is that of gas turbine blades or vanes for aeroengines or industrial turbines.

The fabrication of turbomachine blades of composite material has already been proposed. Reference can be made in particular to international patent application PCT/FR2009/052309 filed jointly by SNECMA and SNECMA Propulsion Solide. This application describes the fabrication of a turbomachine blade made of composite material including a fiber reinforcement densified by a matrix. More precisely, this method exhibits the feature that the fiber blank fabricated by three-dimensional weaving is shaped to obtain a one-piece fiber preform having a first portion constituting an airfoil and blade root preform and at least one second portion constituting an inner platform and blade outer platform preform. Thus, after densification of the preform, it is possible to obtain a blade made of composite material having a fiber reinforcement consisting of the preform and densified by the matrix, and forming a single part with integrated inner platform and/or outer platform.

The blade obtained by such a method has the disadvantage that its outer platform cannot integrate both a function of sealing (through the presence of wipers) to the housing which surrounds the blades and an aerodynamic function (by the presence of covering spoilers defining the outside of the flowpath of the gas stream in the turbine).

French patent application No. 09 58931 filed jointly by SNECMA and SNECMA Propulsion Solide, describes the fabrication of a blade made of composite material forming a single part with integrated inner platform and outer platform, the outer platform providing both the sealing function and the aerodynamic function.

However, the fabrication of such an outer platform with the method described in French patent application No. 09 58931 involves in particular shaping and molding operations with two-layer fiber structures, operations which are completely feasible but which can be more complex to carry out than with single-layer structures. In addition, the blade thus fabricated does not incorporate an anti-tilting wall.

Further, in the event of damage to the outer platform of the blade fabricated according to the method described in French patent application No. 09 58931, the aerodynamic function and the sealing function are both impacted because the outer platform is formed in a single part providing both functions.

Use of CMC materials has also been proposed for turbine nozzles, in particular in application WO 2010/146288.

A conventional metallic turbine nozzle or compressor stator is formed of several assembled sectors, each sector comprising an inner platform, an outer platform and a plurality of airfoils extending between the inner and outer platforms and integral therewith. The inner and outer platforms delimit the gas or air flow passage in the turbine nozzle or compressor stator. On the outside, the outer platforms of the segments are formed integrally with legs allowing the mounting of the turbine nozzle or compressor stator in a casing.

OBJECT AND SUMMARY OF THE INVENTION

One object of the invention is to provide blades or vanes made of composite material, particularly but not necessarily of thermostructural composite material such as CMC, for turbomachine turbines or compressors, which blades or vanes are relatively simple to fabricate and which integrate the required functions.

To this end, according to the present invention, a method is proposed for fabricating a turbomachine blade or vane made of composite material including a fiber reinforcement densified by a matrix, the method including:
  fabrication by three-dimensional weaving of a one-piece fiber blank,
  shaping of the fiber blank to obtain a one-piece fiber preform having a first portion constituting at least an airfoil preform, the airfoil exhibiting two faces, and at least one second portion present only on one of the faces of the airfoil preform, said second portion constituting a preform of a portion of at least one of the following elements: a preform of a flowpath delimiting outer portion of an inner platform, a preform of an inner portion of an inner platform, a preform of a flow path delimiting inner portion of an outer platform, and a preform of an outer portion of an outer platform,
  densification of the preform by a matrix to obtain a blade made composite material having a fiber reinforcement consisting of the preform and densified by the matrix, and forming a single part with at least a portion of one of the following elements: a flowpath delimiting outer portion of an inner platform, an inner portion of an inner platform, a flowpath delimiting inner portion of an outer platform, and an outer portion of an outer platform.

The blades or vanes thus fabricated exhibit a complementary asymmetrical geometry which allows several identical blades or vanes to be interleaved in order to provide the required functions on each side of their airfoil. According to an advantageous feature of the method, in the longitudinal direction of the fiber blank that corresponds to the longitudinal direction of the blade or vane that is to be made, the fiber blank comprises a first set of a plurality of layers of yarns that are linked together to form a first portion of the blank that corresponds to the first portion of the preform, and a second set of a plurality of layers of yarns that are linked together at least locally to form at least one second portion of the blank that corresponds to said at least one second portion of the preform, the yarns of the first set of layers of yarns being not linked to the yarns of the second set of layers of yarns, and yarns of the second set of layers of yarns crossing through the first set of layers of yarns at the or each second portion of the blank.

The provision of unlinked areas allows shaping of the fiber preform without cutting linking yarns, such a cut possibly reducing the mechanical strength of the fiber reinforcement, hence of the fabricated blade or vane.

According to another feature of the method, the fiber blank is woven with a second continuous set of layers of yarns and the shaping of the fiber blank comprises eliminating portions of the second set of layers of yarns external to the or each second portion of the fiber blank by cutting them away.

According to yet another feature of the method, in the first portion of the fiber blank and in a direction that corresponds to the direction extending along the profile of an airfoil of varying thickness in the blade or vane that is to be made, the number of layers of yarns in the first set of layers of yarns is constant. The yarns of the first set of yarns may then be of varying weights and/or counts.

Advantageously, a strip is fabricated by three-dimensional weaving that includes a succession of fiber blanks. These can then be cut out of the strip. The blanks can be woven with the longitudinal direction of the blade or vane to be fabricated in the weft direction or in the warp direction.

One particular object of the invention is to provide blades made of composite material, particularly but not necessarily of thermostructural composite material such as CMC, for turbines or compressors of turbomachinery, which blades are relatively simple to fabricate and which integrate the required functions, namely the sealing, flowpath definition (aerodynamic function), and anti-tilting functions.

To this end, a method is proposed for fabricating a turbomachine blade made of composite material including a fiber reinforcement densified by a matrix, the method including:
  fabrication by three-dimensional weaving of a one-piece fiber blank,
  shaping of the fiber blank to obtain a one-piece fiber preform having a first portion constituting an airfoil and blade root preform, the blade airfoil exhibiting two faces each connecting a leading edge and a trailing edge, and at least one second portion present only on one of the faces of the blade airfoil, said second portion constituting a preform of a portion of at least one of the following elements: blade inner platform, blade anti-tilting wall, blade outer platform spoilers and blade outer platform wipers,
  densification of the preform by a matrix to obtain a blade made composite material having a fiber reinforcement consisting of the preform and densified by the matrix, and forming a single part with at least a portion of one of the following elements: blade inner platform, blade anti-tilting wall, blade outer platform spoilers and blade outer platform wipers.

Compared with the method described in patent application No. 09 58931, the invention provides for providing each of these functions of flowpath definition, sealing, and anti-tilting by distinct portions of the blade which are fabricated from single-layer structures. The blades thus fabricated exhibit a complementary asymmetrical geometry, providing on one side of its airfoil (pressure face or suction face) the sealing function with a portion of blade outer platform wipers, the flowpath definition function with portions of an inner platform and of a blade outer platform spoiler and the anti-tilting function with a portion of an anti-tilting wall. This asymmetrical geometry allows several identical blades to be interleaved in order to provide the required functions on each side of their airfoil.

According to an advantageous feature of the method, in the longitudinal direction of the fiber blank corresponding to the longitudinal direction of the blade to be fabricated, the fiber blank includes a first set of several layers of yarns which are interlinked to form a first portion of the blank corresponding to the airfoil and blade root preform, and a second set of several layers of yarns which are interlinked at least locally to constitute on one of the faces of the blade airfoil at least the second portion of the blank corresponding to a preform of a portion of at least one of the following elements: blade inner platform, anti-tilting wall, blade outer platform spoilers and blade outer platform wipers, the yarns of the first set of yarn layers not being linked to the yarns of the second set of yarn layers, and the first set of yarn layers having yarns of the second set of yarn layers crossing through it at the or each second portion of the blank.

According to one embodiment, in the longitudinal direction corresponding to the longitudinal direction of the fiber blank to be fabricated, the fiber blank includes:
  a first set of several layers of yarns which are interlinked to form a first portion of the blank corresponding to the preform of the airfoil and the blade root;
  a second set of several layers of yarns which are interlinked at least locally to form on one of the faces of the airfoil at least one second portion of the blank corresponding to the preform of a portion of blade inner platform and/or of blade outer platform spoilers and at least one third portion of the blank corresponding to the preform of a portion of blade anti-tilting wall and/or of blade outer platform wipers;
  the yarns of the first set of yarn layers not being linked to the yarns of the second set of yarn layers, and
  the first set of yarn layers having yarns from the second set of yarn layers crossing through it at the or at each second portion of the fiber blank and at the or at each third portion of the fiber blank.

In this case, the fiber blank is woven with a second continuous set of yarn layers and the shaping of the fiber blank includes the elimination by cutting out of portions of the second set of yarn layers outside of the or each second portion of the fiber blank and the or each third portion of the fiber blank.

According to another embodiment, in the longitudinal direction corresponding to the longitudinal direction of the fiber blank to be fabricated, the fiber blank includes:
  a first set of several layers of yarns which are interlinked to form a first portion of the blank corresponding to the airfoil and blade root preform;
  a second set of several layers of yarns which are interlinked at least locally to form on one of the surfaces of the airfoil at least one second portion of the blank corresponding to the preform of a portion of at least one of the following elements: blade inner platform, blade anti-tilting wall, blade outer platform spoilers and blade outer platform wipers and a third portion of the blank corresponding to the preform of all or a portion of one of said elements other than that formed by the second portion; and
  a third set of several layers of yarns which are interlinked at least locally to form on one face of the airfoil at least one fourth portion of the blank corresponding to the preform of all or a portion of one of said element other than that formed by the second and third portions and a fifth portion of the blank corresponding to the preform of all or part of said elements other than that formed by the second, third and fourth portions;
  the yarns of the first set of yarn layers not being linked to the yarns of the second and third sets of yarn layers, and
  the first set of the yarn layers having yarns from the second and third sets of yarn layers crossing through it at second, third, fourth and fifth portions of the fiber blank.

In this case, the fiber blank is woven with a second and a third continuous sets of yarn layers and the shaping of the fiber blank includes the elimination by cutting out of portions of the second and third sets of yarn layers outside of the second, third, fourth and fifth portions of the fiber blank.

According to yet another feature of the method, in the first portion of the fiber blank and in a direction corresponding to that extending along the profile of an airfoil of variable thickness in the blade to be fabricated, the number of yarn layers in the first set of yarn layers is constant. The yarns of the first set of yarns can then have variable weight and/or count.

Advantageously, a strip is fabricated by three-dimensional weaving that includes a succession of fiber blanks. These can then be cut out of the strip. The blanks can be woven with the longitudinal direction of the blade to be fabricated in the weft direction or in the warp direction.

Another particular object of the invention is to provide vanes allowing a turbine nozzle segment or compressor stator segment of composite material to be made, having same functions as a metallic segment, in particular the functions of defining gas or air flowpath by inner and outer platforms and of mounting in a casing via hooks.

To this end, a method is proposed for fabricating a turbomachine vane made of composite material including a fiber reinforcement densified by a matrix, the method including:
  fabrication by three-dimensional weaving of a one-piece fiber blank,
  shaping of the fiber blank to obtain a one-piece fiber preform having a first portion constituting an airfoil preform, the vane airfoil exhibiting two faces each connecting a leading edge and a trailing edge, at least a second portion present only on one of the faces of the blade airfoil preform, said second portion constituting a preform of a flowpath delimiting inner platform portion or of inner platform hooks or overhangs, and at least a third portion present only on one face of the blade airfoil preform, said third portion constituting a preform of a flowpath delimiting outer platform portion or of outer platform hooking legs,
  densification of the preform by a matrix to obtain a blade made composite material having a fiber reinforcement consisting of the preform and densified by the matrix, and forming a single part with at least one of the following elements: flowpath delimiting inner platform portion and inner platform hooks or overhangs, and at least one of the following elements: flowpath delimiting outer platform portion and outer platform hooking legs.

Advantageously, in the longitudinal direction of the fiber blank that corresponds to the longitudinal direction of the vane that is to be made, the fiber blank comprises:
  a first set of a plurality of layers of yarns that are linked at least partially together to form a first portion of the blank that corresponds to the first portion of the preform, and a second set of a plurality of layers of yarns that are linked together at least locally to form a second portion of the blank that corresponds to the second portion of the preform and to form a third portion of the blank that corresponds to the third portion of the preform,
  the yarns of the first set of layers of yarns being not linked to the yarns of the second set of layers of yarns, and
  the second set of layers of yarns crossing through the first set of layers of yarns at first and second locations corresponding to the locations of the second and third portions of the blank, respectively.

According to a particular feature of the method, at the second crossing location, the second set of yarn layers emerges on opposite faces of the first set of yarn layers at locations which are mutually offset in the longitudinal direction of the blank, and the forming of the blank includes folding out portions of the second set of yarn layers extending on the opposite faces of the first set of yarn layers at the second crossing location to form respectively a flowpath delimiting outer platform portion preform and an outer platform hooking legs preform which are mutually offset in the longitudinal direction.

According to another particular feature of the method, at the first crossing location, the second set of yarn layers emerges on opposite faces of the first set of yarn layers at locations which are mutually offset in the longitudinal direction of the blank, and the forming of the blank includes folding out portions of the second set of yarn layers extending on the opposite faces of the first set of yarn layers at the first crossing location to form respectively a flowpath delimiting inner platform portion preform and an inner platform hooks or overhangs preform which are mutually offset in the longitudinal direction.

In another embodiment of the invention, a method is provided for fabricating a turbomachine turbine nozzle segment or compressor stator segment out of a composite material comprising fiber reinforcement densified by a matrix, the method comprising:
  making a plurality of turbine nozzle vanes or compressor stator vanes each including an inner platform, an outer platform and an airfoil extending between the inner and outer platforms and forming one piece therewith, the making of each vane comprising:
    making a one-piece fiber blank by three dimensional weaving;
    shaping of the fiber blank to obtain a one-piece fiber preform having a first portion constituting an airfoil preform, the vane airfoil exhibiting two faces each connecting a leading edge and a trailing edge, at least a second portion present only on one of the faces of the blade airfoil preform, said second portion constituting a preform of a flowpath delimiting inner platform portion or of inner platform hooks or overhangs, and at least a third portion present only on one face of the blade airfoil preform, said third portion constituting a preform of a flowpath delimiting outer platform portion or of outer platform hooking legs; and
    densification of the preform by a matrix to obtain a blade made composite material having a fiber reinforcement consisting of the preform and densified by the matrix, and forming a single piece with at least one of the following elements: flowpath delimiting inner platform portion and inner platform hooks or overhangs, and at least one of the following elements: flowpath delimiting outer platform portion and outer platform hooking legs; and
  assembling and connecting together a plurality of vanes to form a multi-vane turbine nozzle segment or compressor stator segment out of a composite material, the vanes being connected together by a process including a step selected from a brazing step and a step of connection by co-densification by a matrix of a plurality of vanes assembled together at an intermediary stage of densification.

The making of each vane may comprise a step of partial densification of the preform by a matrix and a subsequent machining step, and the connection of a plurality of vanes together comprises assembling machined vanes together and co-densification by a matrix of the assembled machined vanes.

When the turbine nozzle segment or compressor stator segment is made out of a ceramic matrix composite material, the assembling of the machined vanes together may comprise a pre-ceramic bonding step.

Still when the turbine nozzle segment or compressor stator segment is made out of a ceramic matrix composite material, the making of each vane may comprise a first and a second step of densification by a ceramic matrix separated by a machining step, and the connection of a plurality of vanes together may comprise a step of brazing together vanes assembled together after the second densification step.

The present invention also provides a turbomachine blade or vane made of composite material comprising fiber reinforcement obtained by three-dimensional weaving of yarns and densified by a matrix, the blade including a first portion constituting at least an airfoil exhibiting two faces each connecting a leading edge to a trailing edge, the first portion forming a single part with at least one second portion present only on one of the faces of the airfoil, the second portion constituting a portion of at least one of the following elements: a flowpath delimiting outer portion of an inner platform, an inner portion of an inner platform, a flowpath delimiting inner portion of an outer platform, and an outer portion of an outer platform, the portions of the fiber reinforcement corresponding to the first and the second portions of the blade being at least partially mutually imbricated, with yarns of the first portion of the fiber reinforcement penetrating into the second portion of the fiber reinforcement.

According to the present invention, a turbomachine blade of composite material is also proposed including a fiber reinforcement obtained by three-dimensional weaving of yarns and densified by a matrix, the blade including a first portion constituting an airfoil and a blade root, the blade airfoil exhibiting two faces, the first portion forming a single part with at least one second portion present only on one of the faces of the blade airfoil, the second portion constituting a portion of at least one of the following elements: blade inner platform, blade anti-tilting wall, blade outer platform spoilers and blade outer platform wipers, the portions of the fiber reinforcement corresponding to the first and the second portions of the blade being at least partially mutually imbricated, with yarns of the first portion of the fiber reinforcement penetrating into the second portion of the fiber reinforcement.

According to one embodiment of the invention, the second portion constitutes a portion of one of the following elements: blade inner platform, blade anti-tilting wall, blade outer platform spoilers and blade outer platform wipers, the first portion also forming a single part with at least one third portion constituting a portion of at least one of said elements other than that constituted by the second portion, the third portion being present only on one face of the airfoil, the portions of the fiber reinforcement corresponding to the first, second and third portions of the blade being at least partly mutually imbricated, with yarns of the first portion of the fiber reinforcement penetrating into the second and third portions of the fiber reinforcement.

In this case, the first portion can also form a single part with at least one fourth portion constituting a portion of at least one of said elements other than that constituted by said second and third portions, the fourth portion being present only on one face of the airfoil, the portions of the fiber reinforcement corresponding to the first, second, third and fourth portions of the blade being at least in part mutually imbricated, with yarns of the first portion of the fiber reinforcement penetrating into the second, third and fourth parts of the fiber reinforcement.

The first portion can also form a single part with at least one fifth portion constituting a portion of at least one of said elements other than that constituted by said second, third, and fourth portions, said fifth portion being present only on one face of the airfoil, the portions of the fiber reinforcement corresponding to the first, second, third, fourth and fifth portions of the blade being at least in part mutually imbricated, with yarns of the first portion of the fiber reinforcement penetrating into the second, third, fourth and fifth portions of the fiber reinforcement.

According to another embodiment, the second portion constitutes a portion of one of the following elements: blade inner platform, blade anti-tilting wall, blade outer platform spoilers and blade outer platform wipers, the first portion also forming a single part with at least one third portion constituting all or a portion of at least one of said elements other than that constituted by said second portion, the portions of the fiber reinforcement corresponding to the first, second, and third portions of the blade being at least partly mutually imbricated, with yarns of the first portion of the fiber reinforcement penetrating into the second and third portions of the fiber reinforcement.

The blade can be made of a ceramic matrix composite material.

According to one feature of the blade, the yarns constituting the portion of the fiber reinforcement corresponding to the second, third, fourth and/or fifth portions of the blade cross through the portion of the fiber reinforcement corresponding to the first portion of the blade.

The blade airfoil can have a variable thickness profile along which the portion of the fiber reinforcement corresponding to the first portion of the blade has, in the longitudinal direction of the blade, a constant number of yarn layers having a variable weight and/or count, or a variable number of yarn layers.

According to the present invention, a turbomachine vane of composite material is also proposed including a fiber reinforcement obtained by three-dimensional weaving of yarns and densified by a matrix, the vane including a first portion constituting an airfoil having two opposite faces, the first portion forming a single part with at least a second portion present only on one of the faces of the vane airfoil, said second portion constituting a flowpath delimiting inner platform portion or inner platform hooks or overhangs, and at least a third portion present only on one face of the blade airfoil preform, said third portion constituting a flowpath delimiting outer platform portion or outer platform hooking legs, the portions of the fiber reinforcement corresponding to the first and the second portions of the blade being at least partially mutually imbricated, with yarns of the first portion of the fiber reinforcement penetrating into the second portion of the fiber reinforcement.

The invention also provides a turbomachine rotor or disk fitted with blades as defined above.

The invention also provides a turbine nozzle segment or a compressor stator segment comprising a plurality of vanes as defined above which are connected together.

The invention also provides a turbomachine fitted with blades or vanes as defined above.

BRIEF DESCRIPTION OF DRAWINGS

The invention will be better understood from the description given hereafter, by way of indication but without limitation, with reference to the appended drawings in which:

FIG. 3 illustrates very schematically the arrangement of three sets of yarn layers in a three-dimensionally woven fiber blank designed for the fabrication of a fiber preform for a blade such as that illustrated by FIG. 1;

FIGS. 4, 5 and 6 illustrate successive fabrication steps of a fiber preform for a blade such as that illustrated by FIG. 1, starting with the fiber blank of FIG. 3;

FIGS. 10A and 10B are partial section views in a plane parallel to the warp and weft directions in a portion of the fiber blank of FIG. 3 corresponding to the junction location between, on the one hand, the airfoil and a portion of blade anti-tilting wall and, on the other hand, between the airfoil and a portion of blade inner platform;

FIG. 10C is a partial weft section view in a portion of the fiber blank of FIG. 2 corresponding to the junction location between the airfoil and portions of blade anti-tilting wall and of portions of blade inner platform;

FIGS. 11A and 11B are partial section views in a plane parallel to the warp and weft directions in a portion of the fiber blank of FIG. 3 corresponding to the junction location between, on the one hand, the airfoil and a portion of blade outer platform spoiler and, on the other hand, between the airfoil and a portion of blade outer platform wipers;

FIG. 11C is a partial weft section view in a portion of the fiber blank of FIG. 2 corresponding to the junction location between the airfoil and portions of blade anti-tilting wall and a portion of blade inner platform;

FIG. 12A is a weft section view showing an example of arrangement of weft yarns in a portion of the fiber blank corresponding to a portion of the airfoil root;

FIGS. 12B to 12D are weft section views showing warp planes for an example of three-dimensional (multilayer) weaving in the fiber blank portion of FIG. 12A;

FIG. 13 is a partial schematic section view showing another embodiment of a portion of the blank corresponding to an airfoil root;

FIG. 21 is a highly diagrammatic representation of the disposition of two sets of layers of yarns in a three-dimensional woven fiber blank for use in making a fiber preform for a vane as shown in FIG. 20;

FIGS. 22, 23 and 24 show successive steps in making a fiber preform for a vane as shown in FIG. 20, starting from the fiber blank of FIG. 21;

DETAILED DESCRIPTION OF EMBODIMENTS

First Embodiments: Turbomachine Blades

Figure 1:
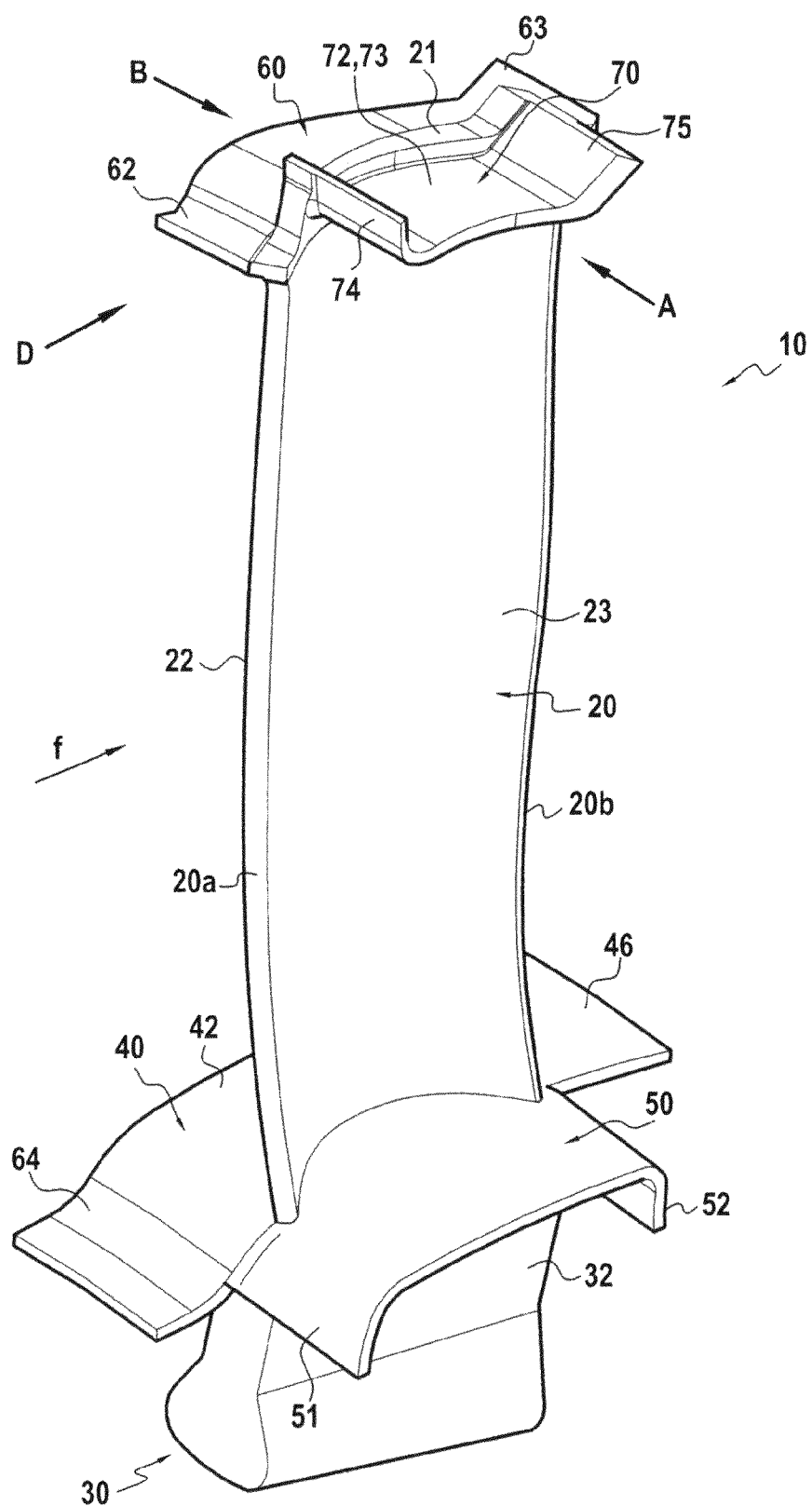
FIG. 1 is a perspective view of a turbomachine blade in conformity with one embodiment of the invention.

The invention is applicable to different types of turbomachine blades having integrated inner platforms and/or outer platforms, particularly compressor and turbine blades of different gas turbine spools, for example a low pressure turbine (BP) rotor blade like that illustrated by FIG. 1.

The blade 10 of FIG. 1 includes, in well-known fashion, an airfoil 20, a root 30 constituted by a portion having greater thickness, having for example a bulb-shaped section, continuing in a tang 32. The airfoil 20 extends in the longitudinal direction between its root 30 and its tip 21 and shows in cross-section a dished profile with variable thickness defining two faces 22 and 23, corresponding respectively to the suction face and to the pressure face of the airfoil 20 and each connecting the leading edge 20a and the trailing edge 20b of the last mentioned.

The blade 10 is mounted on a turbine rotor (not illustrated) by insertion of the root 30 into a recess of matching shape provided at the periphery of the rotor.

In conformity with one embodiment of the invention, the airfoil 20 also includes four distinct elements respectively constituting a blade inner platform 40 portion, a blade anti-tilting wall 50 portion, a blade outer platform spoilers 60 portion and a blade outer platform wipers 70 portion.

More precisely, at its radially inward end and on its face 22, the airfoil 20 connects to the blade inner platform 40 portion the outer (or upper) surface 42 whereof defines, radially inward, the flowpath of a gas stream f. In its upstream and downstream end portions (in the flow direction f of the gas stream), the platform 40 portion ends in covering spoilers 44 and 46. In the'example illustrated, the surface 42 of the platform portion is tilted, generally forming a nonzero angle relative to the normal to the longitudinal direction of the blade. Depending on the desired profile of the inner surface of the gas stream flowpath, the angle could be zero, or the surface 42 could have a generally non-rectilinear profile, dished for example.

Still at its radially inward end but on its face 21, the blade 20 connects to the anti-tilting wall 50 portion which comprises flanks 51 and 52 at its upstream and downstream ends capable of preventing tilting of the blade when the latter is mounted on a turbine rotor.

Figure 2C:
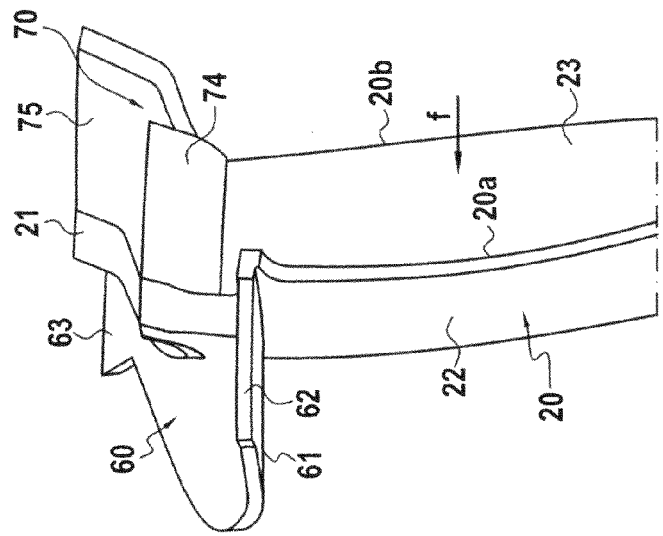
FIGS. 2A through 2C are enlarged views of portions of the blade of FIG. 1.
Figure 2B:
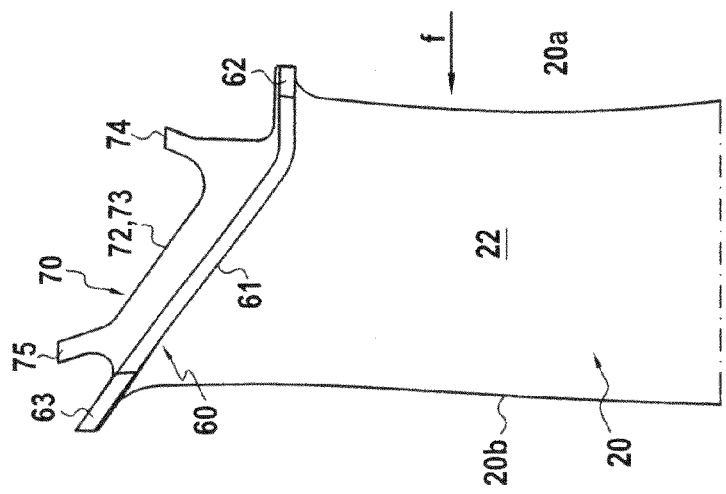

The airfoil 20 also connects at its radially outward end and on its face 22 to the blade outer platform spoiler 60 portion which defines on its inner (lower) surface 61, radially outward, the flowpath of the gas stream f (FIGS. 1 and 2C). In its upstream and downstream end portions, the blade outer platform spoiler 60 portion ends in covering spoilers 62 and 63. In the example illustrated, the surface 61 of the blade outer platform spoiler 60 portion exhibits a tilted rectilinear profile generally forming a nonzero angle relative to the normal to the longitudinal direction of the blade or the surface 61 (FIG. 2B). As a variant, depending on the desired profile of the outer surface of the gas stream flowpath, the surface 61 could have a generally non-rectilinear profile, dished for example, and/or extend substantially perpendicularly to the longitudinal direction of the blade.

Figure 2A:
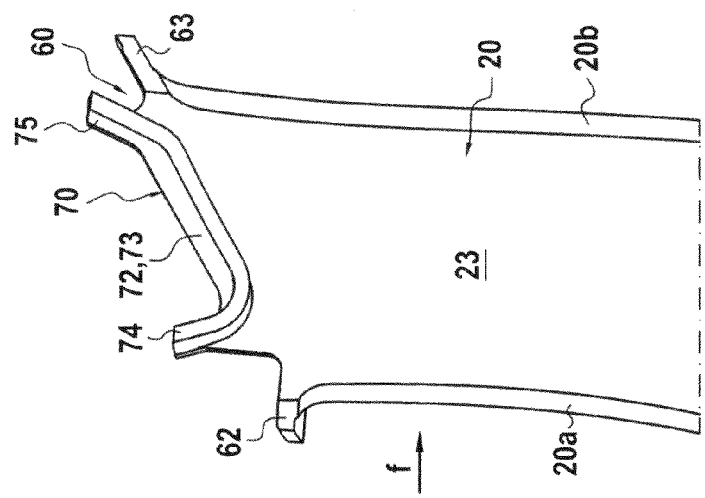

Still at its radially outward end but on its face 21, the airfoil connects to the blade outer platform wipers 70 portion. On its outer (upper) surface 72, the blade outer platform wipers 70 portion defines a depression or bathtub 73 (FIGS. 1 and 2A). Along the upstream and downstream edges of the bathtub 73, the portion 70 carries wipers 74 and 75 having a tooth-shaped profile the tips whereof can penetrate into a layer of abradable material of a turbine ring (not shown) to reduce the clearance between the blade tip and the turbine ring.

As illustrated in FIG. 1, the blade inner platform 40 portion, the blade anti-tilting wall 50 portion, the blade outer platform spoilers 60 portion and the blade outer platform wipers 70 portion are respectively present only on one of the faces of the airfoil. In other words, the face of the airfoil opposite that comprising one or more of these elements lacks the or these same elements. Thus, the functions of defining (radially outside) the flowpath and of anti-tilting customarily performed by one and the same element present at the radially inward end of the airfoil are performed, in the blade of the invention, by distinct elements to wit, in the example described here, by the blade inner platform 40 portion and the blade anti-tilting wall 50 portion. Likewise, the flowpath definition and sealing customarily performed by one and the same element present at the radially outward end of the airfoil are performed, in the blade of the invention, by distinct elements to wit, in the example described here, by the blade outer platform spoilers 60 portion and the blade outer platform wipers 70 portion.

FIG. 3 shows very schematically a fiber blank 100 starting with which a fiber blade preform can be shaped in order to obtain, after densification by a matrix and possible machining, a blade made of composite material with integrated inner platform, anti-tilting wall, blade outer platform spoilers and wipers portions like that illustrated in FIG. 1.

The blank 100 includes two portions 102 and 104 obtained by three-dimensional weaving or multilayer weaving, only the envelopes of these three portions being shown in FIG. 3. The portion 102 is designed, after shaping, to constitute a portion of a fiber blade preform corresponding to an airfoil and blade root preform. The portion 104 is designed, after shaping, to constitute the portions of the fiber blade preform corresponding to preforms of the blade anti-tilting portion, the blade outer platform wiper portion, the blade inner platform portion and the blade outer platform spoilers portion.

The two portions 102 and 104 are in the form of strips extending generally in a direction X corresponding to a longitudinal direction of the blade to be fabricated. The fiber strip 102 exhibits, in its portion designed to constitute an airfoil preform, a variable thickness determined according to the thickness of the profile of the airfoil of the blade to be fabricated. In its portion designed to constitute a root preform, the fiber strip 102 exhibits an extra thickness 103 determined according to the thickness of the root of the blade to be fabricated.

The fiber strip 102 has a width 1 selected according to the length of the developed (flattened) profile of the airfoil and the root of the blade to be fabricated while the fiber strips 104 and 106 each have a width L greater than 1 selected according to developed lengths of the blade anti-tilting wall, inner platform, blade outer platform spoilers and wipers portions to be fabricated.

The fiber strip 104 has a substantially constant thickness determined according to the thicknesses of the anti-tilting wall, inner platform and outer platform spoiler and wiper portions of the blade to be fabricated. The strip 104 includes a first portion 104a, which extends along and in the vicinity of a first surface 102a of the strip 102 designed to constitute the pressure face of the airfoil, a second portion 104b, which extends along and in the vicinity of the second surface 102b of the strip 102 designed to constitute the suction face of the airfoil, and a third portion 104c which extends along and in the vicinity of the first surface 102a of the strip 102.

The portions 104a and 104b of the strip 104 are linked by a connecting portion 140c which extends transversely relative to the strip 102 at a location corresponding to that of the anti-tilting wall portion and the inner platform portion of the blade to be fabricated.

The portions 104b and 104c of the strip 104 are linked by a connecting portion 150c which extends transversely relative to the strip 102 at a location corresponding to that of the outer platform wiper portion and of the outer platform spoiler portion of the blade to be fabricated.

Depending on the desired geometry at the outer platform wiper portion of the blade, at the blade outer platform spoiler portion, at the anti-tilting wall portion and at the blade inner platform portion, the connecting portions 140c and 150c can cross through the strip 102, entering and/or emerging, substantially perpendicularly to the longitudinal direction X of the blank or following a curved profile as described hereafter in relation to FIGS. 10A, 10B, 11A and 11B. As described in more detail later, the strips 102 and 104 are simultaneously woven by three-dimensional weaving, with no linkage between the strip 102 and the portions 104a, 104b and 104c of the strip 104 by continuously weaving a plurality of successive blanks 100 in the X direction.

FIGS. 4 through 6 show very schematically how a fiber preform having a shape close to that of the blade to be fabricated can be obtained starting with the fiber blank 100.

The strip 102 is cut at one end in the extra thickness 103 and at another end slightly beyond the connecting portion 150c to obtain a strip 120 with a length corresponding to the longitudinal dimension of the blade to be fabricated with a swollen portion 130 constituted by a portion of the extra thickness 103 and situated at a location corresponding to the position of the root of the blade to be fabricated.

In addition, cutouts are made at the ends of the portions 104a and 104c of the strip 104 and in the portion 104b thereof so as to free independent segments 140a and 140b extending to either side of the connecting portion 140c as well as independent segments 150a and 150b on either side of the connecting portion 150c, as shown in FIG. 4.

The lengths of the portions 140a, 140b, 150a and 150b are determined according to the lengths of the inner platform, anti-tilting wall, outer platform spoilers and outer platform wipers portions in the blade to be fabricated.

Due to the absence of linkage between the strip 102 and the portions 104a, 104b and 104c of the strip 104, the portions 140a, 140b, 150a and 150b can be folded back perpendicularly to the strip 102 without cutting yarns so as to form plates as shown in FIG. 5.

A fiber preform 200 of the blade to be fabricated is then obtained by molding with deformation of the strip 102 to reproduce the dished profile of the blade airfoil. The portions 140a and 140b are also deformed to reproduce shapes similar respectively to that of the inner platform portion of the blade (with its covering spoilers in particular) and to that of the anti-tilting wall portion of the blade. Likewise, the portions 150a and 150b are deformed to reproduce shapes similar respectively to that of blade outer platform spoilers portion and to the outer platform wipers portion of the blade (see FIG.

5). A preform 200 is thus obtained having an airfoil preform portion 220 including a surface 220a designed to constitute the pressure face of the airfoil and a surface 220b designed to constitute the suction face of the airfoil, root preform portion 230 (with tang preform), an inner platform portion preform portion 240, an anti-tilting wall portion preform portion 250, a blade outer platform covering spoilers portion preform portion 260 and an outer platform wipers portion preform portion 270 (FIG. 6).

As described later, the steps in fabricating a blade preform starting with a fiber blank are advantageously carried out after treatment of the fibers of the blank and its impregnation with a consolidation composition.

A three-dimensional weaving method for the fiber blank 100 will now be described in greater detail.

It is assumed that the weaving is carried out with warp yarns extending in the longitudinal direction X of the blank, it being specified that weaving with the weft yarns in this direction is also possible.

The variation in thickness of the strip 102 over its length is obtained by using warp yarns having variable weight. As a variant or a supplement it is possible to vary the count of the yarns (number of yarns per unit of length in the weft direction), a smaller count allowing greater thinning during shaping of the preform by molding.

Figure 7:
FIG. 7 is a section view showing the flattened profile of a blade airfoil such as that of FIG. 1.
Figure 8:
FIG. 8 is a section view of a set of warp yarn layers making it possible to obtain a profile such as that of FIG. 7.

Thus, to obtain a blade airfoil profile as shown in flat projection in FIG. 7, 3 layers of warp yarns can be used with variable weight and count as illustrated in FIG. 8.

In one example of implementation, the yarns used can be silicon carbide (SiC) yarns supplied under the name "Nicalon" by the Japanese company Nippon Carbon and having a weight (number of filaments) of 0.5K (500 filaments).

The warp is made with 0.5K SiC yarns and 1K SiC yarns obtained by the combination of two 0.5K yarns, the two yarns being combined by covering. Covering is carried out advantageously with filament of a temporary nature capable of being eliminated after weaving, for example a polyvinyl alcohol (PVA) filament that can be eliminated by dissolving in water.

Table I below gives, for each column of warp yarns, the count (number of yarns/cm over the length of the profile), the number of 0.5K yarns, the number of 1K yarns and the profile thickness in mm, the latter varying between approximately 1 mm and 2.5 mm:

equal to 3 (layers $C_{11}$, $C_{12}$, $C_{13}$). The warp yarns are linked by weft yarns $t_1$ by three-dimensional weaving.

The strip 104 also includes a set of warp yarns for example identically equal to 3 (layers $C_{21}$, $C_{22}$, $C_{23}$) linked by weft yarns $t_2$ by three-dimensional weaving, like the strip 102.

It is noted that the weft yarns $t_1$ do not extend into the layers of warp yarns of the strip 104, that the weft yarns $t_2$ do not extend into the layers of warp yarns of the strip 102 in order to leave them unlinked.

In the example illustrated, the weaving is multilayer weaving performed with a satin or multi-satin type weave. Other types of three-dimensional weaving can be used, for example multilayer weaving using a multiple plain weave or weaving with an "interlock" type weave. What is meant here by "interlock" weaving is a weave wherein each layer of weft yarns links several layers of warp yarns with all the yarns of a given warp column having the same path in the plane of the weave.

Different methods of three-dimensional weaving are described in particular in document WO 2006/136755.

FIGS. 10A and 10B are section views parallel to the warp and weft directions at the crossing of the strip 102 respectively by the connecting portions 140c and 150c of the strip 104 of the fiber blanks of FIG. 3. FIG. 10A shows the entry of the warp yarns into the strip 104 on the side of the surface 102a (pressure face) of the strip 102 at the connecting portion 140c. At this location, each layer of warp yarns of the strip 104 (here layers $C_{21}$, $C_{22}$, $C_{23}$) penetrates between the weft yarns $t_1$ of the strip 102 following a dished profile such as that shown in FIG. 10A.

FIG. 10B shows the emergence of the warp yarns in the strip 104 on the side of the surface 102b (suction face) of the strip 102 at the connection portion 140c. At this location, each layer of warp yarns of the strip 104 (here layers $C_{21}$, $C_{22}$, $C_{23}$) emerge between the weft yarns $t_1$ of the strip 102 following a dished profile such as that shown in FIG. 10B.

Naturally, depending on the desired shape of the anti-tilting wall portion and of the inner blade platform portion, the layers of warp yarns of the strip 104 can enter and emerge from the strip 102 with different profiles such as rectilinear profiles for example.

The crossing of the strip 104 from one side to the other of the strip 102 is achieved, during weaving, by having each warp yarn of the strip 104 individually cross through all the warp and weft yarns of the strip 102.

TABLE I

| | Column | | | | | | | | | | | | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 |
| Count | 6 | 6 | 6 | 6 | 6 | 6 | 6 | 8 | 8 | 8 | 8 | 8 | 8 | 8 | 8 | 8 | 8 | 8 | 6 |
| No of 0.5K yarns | 3 | 3 | 3 | 3 | 3 | 3 | 3 | 2 | 1 | 0 | 0 | 0 | 0 | 0 | 0 | 0 | 2 | 1 | 3 |
| No of 2 × 0.5K yarns | 0 | 0 | 0 | 0 | 0 | 0 | 0 | 1 | 2 | 3 | 3 | 3 | 3 | 3 | 3 | 3 | 1 | 2 | 0 |
| Thickness | 1 | 1 | 1 | 1 | 1 | 1 | 1.2 | 1.5 | 2 | 2.2 | 2.4 | 2.5 | 2.4 | 2.4 | 2.2 | 2.1 | 1.8 | 1.5 | 1.2 |

Naturally, depending on the weights of the available yarns, different combinations of numbers of yarn layers and of variations of count and of weight can be adopted for the profile to be obtained.

Figure 9A:
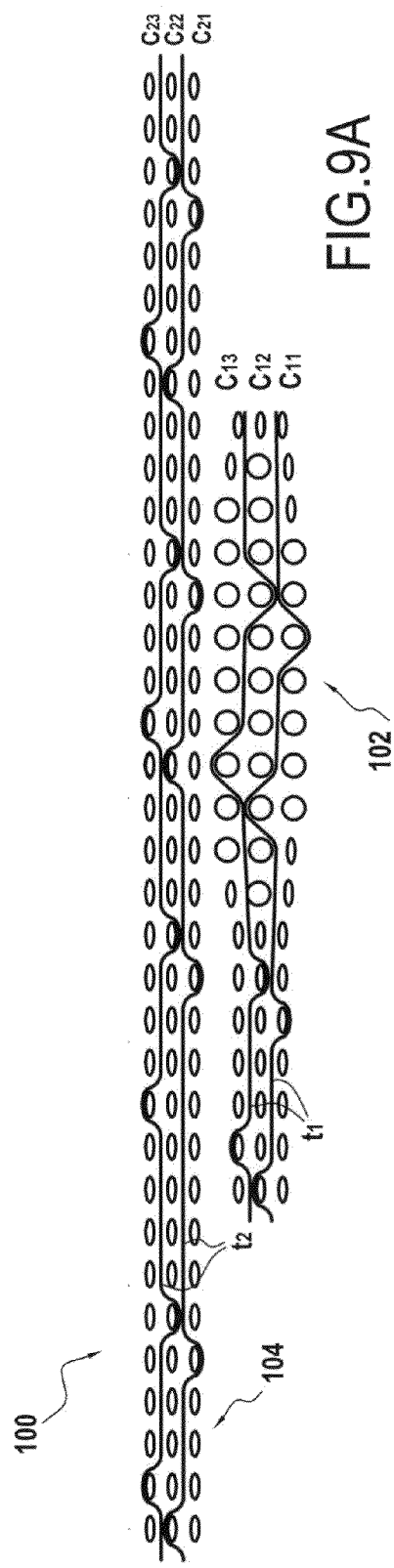
FIGS. 9A and 9B are section views showing a method of weaving the fiber blank of FIG. 3.
Figure 9B:
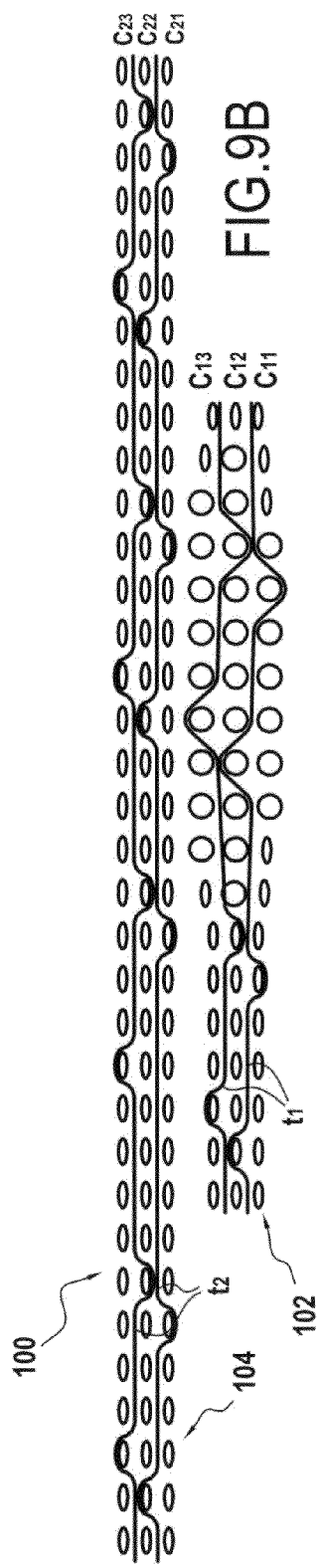

FIGS. 9A, 9B show, in warp section, two successive plans of a weave which can be used for weaving the fiber blank 100 of FIG. 3 outside the extra thickness 103.

The strip 102 of the fiber blank 100 includes a set of warp yarn layers, the number of layers being here for example FIG. 10C is a weft section view at the crossing of the strip 102 by the connecting portion 140c of the strip 104. It is observed that the layers of warp yarns of the strip 104 (here layers $C_{21}$, $C_{22}$, $C_{23}$), and of course the weft yarns $t_1$ of the strip 104, will not re-emerge from the strip 102 at the same place as that of their entry into the strip 102. Indeed, between their entry (on the side of the face 102a) into the strip 102 and their emergence (on the side of the face 102b), the warp yarns of the strip 104 are held within the strip 102 over a distance $d_1$ which makes it possible to form the offset between the portions 104a and 104b at the connecting portion 140c (FIG. 3). This offset makes it possible to form, as illustrated in FIG. 1, a blade inner platform portion 40 which is above the anti-tilting wall portion 50 in the direction of the airfoil 20.

FIGS. 11A and 11B are section views parallel to the warp and weft directions at the crossing of the strip 102 by the connecting portion 150c of the strip 104 of the fiber blank of FIG. 3. FIG. 11A shows the entry of the warp yarns into the strip 104 on the side of the face 102b (suction face) of the strip 102 at the connecting portion 150c. At this location, each layer of warp yarns of the strip 104 (here layers $C_{21}, C_{22}, C_{23}$) penetrates between the weft yarns $t_1$ of the strip 102 following a dished profile such as that shown in FIG. 11A.

FIG. 11B shows the emergence of the warp yarns in the strip 104 on the side of the face 102a (pressure face) of the strip 102 at the connecting portion 150c. At this location, each layer of warp yarns of the strip 104 (here layers $C_{21}, C_{22}, C_{23}$) emerge between the weft yarns $t_1$ of the strip 102 following a dished profile such as that shown in FIG. 11B.

Of course, depending on the desired shape of the blade outer platform spoiler portion and of the blade outer platform wipers portion, the layers of warp yarns of the strip 104 can enter and emerge from the strip 102 with profiles having different shapes such as rectilinear profiles for example.

FIG. 11C is a weft section view at the crossing of the strip 102 by the connecting portion 150c of the strip 104. It is observed that the warp yarn layers (here layers $C_{21}, C_{22}, C_{23}$) of the strip 104, and of course the weft yarns $t_1$ of the strip 104, will not emerge from the strip 102 at the same location as that of their entry into the strip 102. Indeed, between their entry (on the side of the face 102b) into the strip 102 and their emergence (on the side of the face 102a), the warp yarns of the strip 104 are held within the strip 102 over a distance $d_2$ which allows the creation of the offset between the portions 104b and 104c at the connecting portion 150c (FIG. 3). This offset makes it possible to form, as illustrated in FIG. 1, a blade outer platform wipers portion 70 which is above the blade outer platform spoiler portion 60 in the direction of the airfoil 20.

The extra thickness 103 can be obtained by using warp yarns having greater weight and additional layers of weft yarns.

In FIG. 12A, the number of layers of weft yarns changes in this example from 4 to 7 between a portion $102_1$ of the strip 102, corresponding to the tang of the blade, and the portion $102_3$ of the strip 102 having the extra thickness 103.

In addition, weft yarns $t_1, t'_1, t''_1$ having different weights are used, the yarns $t_1$ being for example "Nicalon" SiC yarns of 0.5K weight (500 filaments), the yarns $t'_1$ being obtained by the combination of two 0.5K yarns and the yarns $t''_1$ by the combination of three 0.5K yarns.

The weaving in the blank portion $102_3$ necessitates layers of warp yarns in greater number than in the portion $102_1$. This is advantageously achieved during transition between the portion $102_1$ and the portion $102_3$ by reducing the number of warp planes by constituting each warp plane in the portion $102_3$ by combining warp yarns from two warp planes of the portion $102_1$. FIGS. 12B and 12C show two neighboring warp planes in the portion $102_1$ and FIG. 12D shows a warp plane obtained in the portion $102_3$ by combination of the warp planes of FIGS. 12B and 12C. In FIGS. 12B, 12C and 12D, the different weights of the warp yarns (as shown in FIG. 8) or of the weft yarns are not shown for the sake of simplicity. Between FIGS. 12B, 12C, on the one hand, and FIG. 12D, on the other hand, the dashes show how the warp yarns of the different layers in FIGS. 12B, 12C form the layers of warp yarns of FIG. 12D.

Of course, different combinations of numbers of weft layers and of weft yarn weights can be adopted to form the extra thickness 103.

According to another embodiment shown schematically in FIG. 13, the extra thickness 103 can be obtained by introducing an insert during weaving of the strip 102.

In FIG. 13, the set $T_1$ of weft yarn layers of the portion $102_1$ of the strip 102 corresponding to the tang of the blade is divided by omitting linking during weaving into two subsets $T_{11}, T_{12}$ between which an insert $103_1$ is inserted. In the example illustrated, the portion $102_1$ has a greater thickness than of the portion $102_2$ of the strip 102 corresponding to the blade airfoil. The transition between the $102_2$ and the portion $102_1$ can be made in the same manner as described above for the transition between the portions $102_1$ and $102_3$ of FIG. 12A. The crossing of the strip 102 by the strip 104 and at the connecting portion 140c of FIG. 3 can optionally be performed through the thickened portion $102_1$.

At the end of the insert 103, opposite the portion $102_1$, the subsets $T_{11}, T_{12}$ of weft yarn layers are once again reunited by weaving to form a portion $102'_1$ having the same thickness as the portion $102_1$, then, by thickness reduction, a portion $102'_2$ having the same thickness as the portion $102_2$, the portion $102'_2$ forming the portion corresponding to a blade airfoil for the following woven blank.

The insert $103_1$ is preferably made of monolithic ceramic, preferably the same ceramic material as that of the matrix of the composite material of the blade to be fabricated. Thus, the insert $103_1$ can be a block of SiC obtained by sintering SiC powder.

Figure 14:
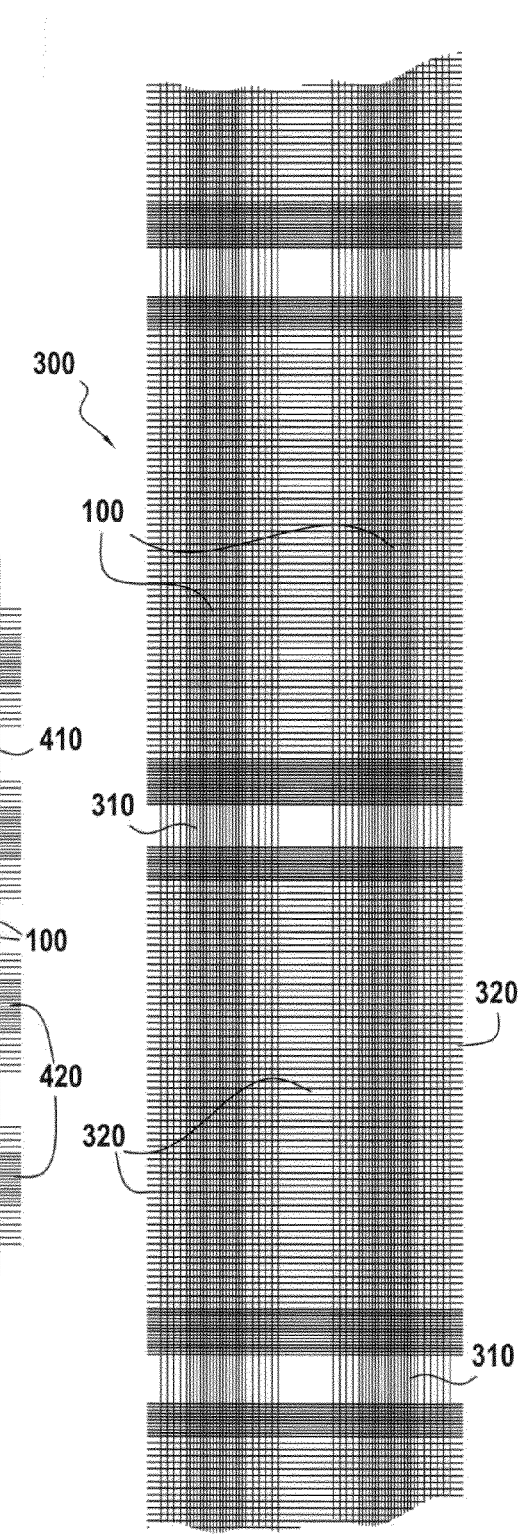

As shown very schematically by FIG. 14, a plurality of fiber blanks 100 can be obtained by weaving a strip 300 wherein are formed one or more rows of successive fiber blanks. Extra-length areas 310, 320 are provided in the warp direction (warp yarns only) and in the weft direction (weft yarns only) to avoid edge effects connected with weaving, to leave more freedom to deform during shaping of the preform and to provide transition areas between blanks 100.

Figure 15:
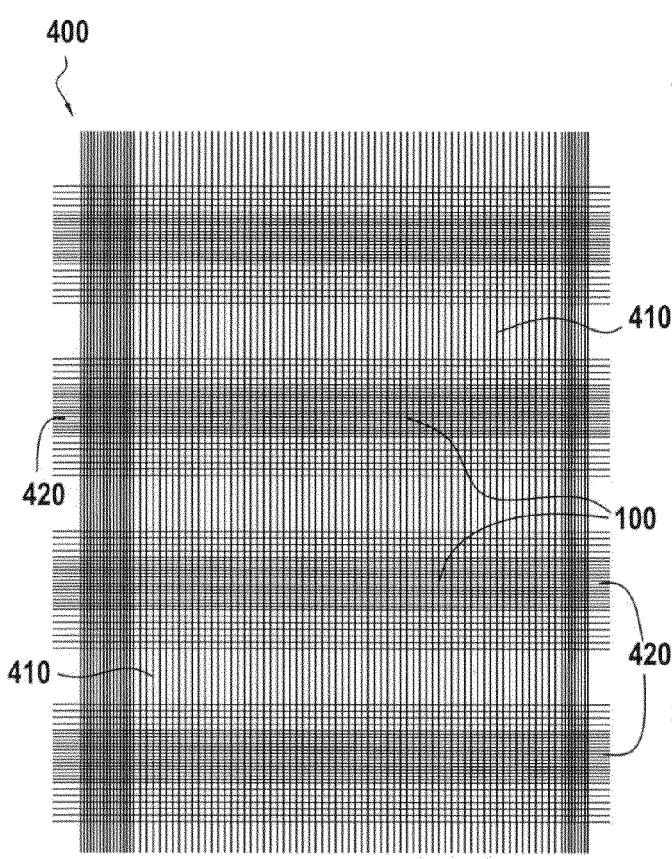
FIGS. 14 and 15 illustrate very schematically two embodiments of a woven fiber strip obtained by three-dimensional weaving including a plurality of fiber blanks like that of FIG. 3.

FIG. 15 shows a variant of implementation according to which a strip 400 is made with a row of blanks 100 woven in the weft direction perpendicularly to the longitudinal direction of the strip. Extra-length areas 410, 420 are also provided in the warp direction and in the weft direction. Several rows of blanks 100 can be woven, the width of the strip 400 being adjusted to this end.

Figure 16:
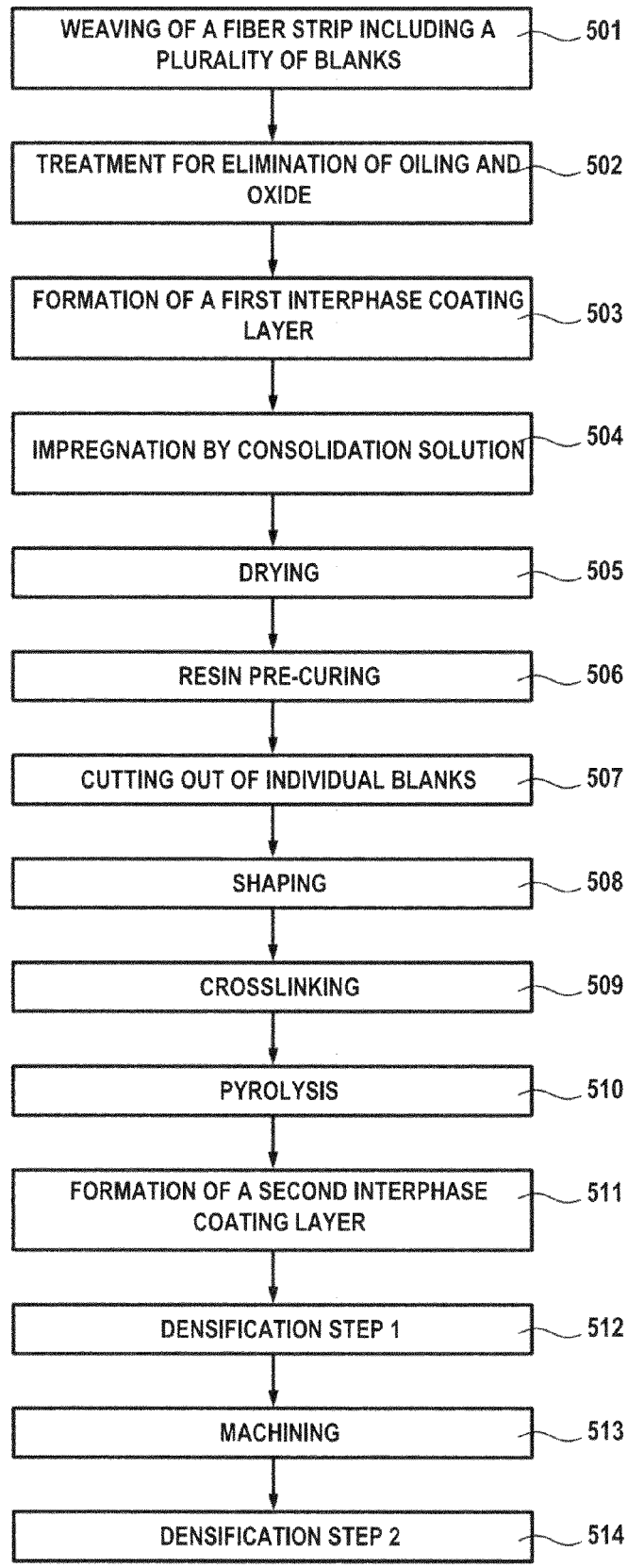
FIG. 16 indicates successive steps in an embodiment of a fabrication method for a turbomachine blade in conformity with the invention.

Successive steps of a manufacturing method for a blade made of composite material according to one embodiment of the invention are indicated in FIG. 16.

At step 501, a fiber strip is woven by three-dimensional weaving having a plurality of fiber blanks, for example several rows of fiber blanks oriented in the warp direction, as shown in FIG. 15. For turbomachine blades designed for use at high temperature and particularly in a corrosive environment (particularly humidity), yarns made of ceramic fibers are used for weaving, particularly silicon carbide (SiC) fibers.

At step 502, the fiber strip is treated to eliminate oiling present on the fibers and the presence of oxide on the surface of the fibers. The elimination of the oxide is obtained by acid treatment, particularly by immersion in a hydrofluoric acid bath. If the oiling cannot be eliminated by the acid treatment, a prior treatment for eliminating oiling is carried out, for example by decomposition of the oiling by a brief heat treatment.

At step 503, a thin layer of interphase coating is formed on the fibers of the fiber strip by chemical vapor infiltration or CVI. The material of the interphase coating is for example pyrolytic carbon or pyrocarbon (PyC), boron nitride (BN) or boron-doped carbon (BC, with for example 5 atom percent (oat) to 20% at B, the remainder being C). The thin layer of interphase coating has preferably a small thickness, for example equal to 100 nanometers at most, or even equal to 50 nanometers at most, so as to maintain good deformability of the fiber blanks. Preferably, the thickness is at least equal to 10 nanometers.

At step 504, the fiber strip with the fibers coated with a thin interphase coating layer is impregnated with a consolidation composition, typically a resin possibly diluted in a solvent. A carbon precursor resin can be used, for example a phenolic or furanic resin, or a ceramic precursor resin, for example a polysilazane or polysiloxane resin precursor of SiC.

After drying by elimination of any solvent in the resin (step 505), a pre-curing of the resin can be carried out (step 506). The pre-curing, or partial crosslinking, allows an increase in the stiffness, hence the strength, while still preserving the deformability needed for the fabrication of blade preforms.

At step 507, the individual fiber blanks are cut out, as illustrated by FIGS. 4 and 5.

At step 508, a fiber blank thus cut out is shaped (as illustrated by FIGS. 5 and 6) and placed in a mold, made of graphite for example, for forming of the airfoil and root preform portion and of the inner platform portion, anti-tilting wall portion, blade outer platform spoilers portion and outer platform wipers portion preform portions.

Thereafter, the crosslinking of the resin is completed (step 509) and the crosslinked resin is pyrolized (step 510). The crosslinking and the pyrolysis can be concatenated by progressively raising the temperature in the mold.

After pyrolysis, a fiber preform consolidated by the pyrolysis residue is obtained. The quantity of consolidation resin is selected so that the pyrolysis residue links the fibers of the preform sufficiently that it can be handled while retaining its shape without the assistance of tooling, it being specified that the quantity of consolidation resin is preferably chosen to be as low as possible.

Steps consisting of eliminating oiling, of acid treatment and of formation of interphase coating for a substrate made of SiC fibers are known. Reference can be made to document U.S. Pat. No. 5,071,679.

A second interphase layer is formed by CVI (step 511) in order to generally obtain a fiber-matrix interphase having sufficient thickness to provide its function of brittleness relief of the composite material. The second interphase layer can be a material selected from among PyC, BN, BC, not necessarily the same as that of the first interphase layer. The thickness of the second interphase layer is preferably at least equal to 100 nanometers.

The fabrication of two-layer interphase, as indicated earlier, is preferred. It is described in French patent application No. 08 54937 by SNECMA Propulsion Solide.

Densification by a matrix of the consolidated preform is then carried out. For a turbomachine blade designed for use at high temperature, and particularly in a corrosive environment, the matrix is of ceramic, for example of SiC. Densification can be carried out by CVI, in which case formation of the second interphase layer and densification by the matrix can be concatenated in the same furnace.

Densification can be carried out in two successive steps (steps 512 and 514) separated by a step 513 consisting of machining the blade to the desired dimensions.

It will be noted that a pre-machining operation can be carried out between steps 509 and 510, that is to say after crosslinking and before pyrolysis of the resin.

Figure 17:
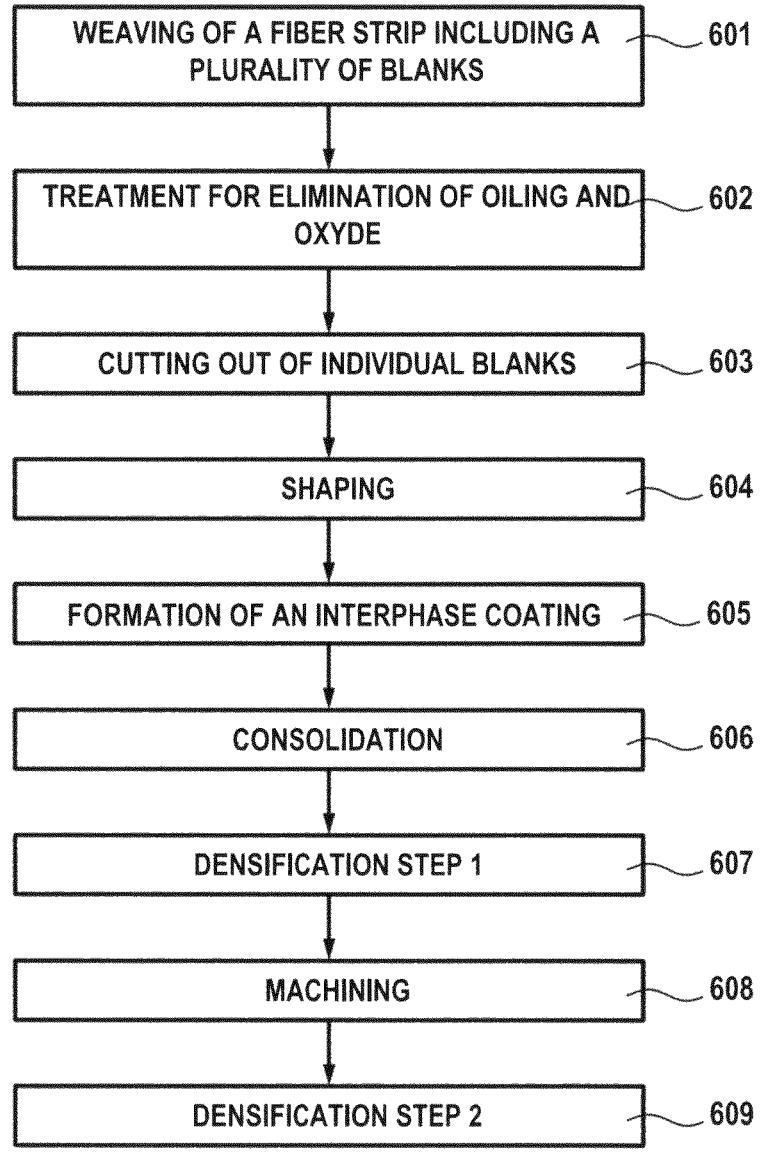
FIG. 17 indicates successive steps of another embodiment of a fabrication method for a turbomachine blade in conformity with the invention.

Successive steps of a manufacturing method of a blade made of composite material according to another embodiment of the invention are given in FIG. 17.

Step 601 consisting of three-dimensional weaving of a fiber strip having a plurality of fiber blanks and step 602 consisting of treatment for eliminating oiling and oxide are similar to steps 501 and 502 of the embodiment of FIG. 16.

At step 603, individual fiber blanks are cut out of the fiber strip, then each individual fiber blank is shaped in a mold or former (step 604) to obtain a fiber blade preform by forming of the airfoil and root preform portion and of the inner platform portion, anti-tilting wall portion, blade outer platform spoilers portion and outer platform wipers portion preform portions.

At step 605, an interphase brittleness relief coating is formed by CVI on the fibers of the preform held in the former. The material of the interphase coating is for example PyC, BN or BC, as previously mentioned. The thickness of the interphase coating is roughly one to a few hundred nanometers.

The preform still being held in the former, consolidation of the preform by partial densification is carried out (step 606), the consolidation being carried out by formation of a ceramic deposit on the fibers by CVI.

The formation of the interphase coating by CVI and consolidation by ceramic deposit by CVI can be concatenated in the same CVI furnace.

The former is preferably made of graphite and exhibits holes facilitating the passage of reactive gas phases giving the interphase deposit by CVI.

When consolidation is sufficient that the preform can be handled which still retaining its shape without the assistance of holding tooling, the consolidated preform is removed from the former and densification by a ceramic matrix by CVI is carried out. The densification can be performed in two successive steps (steps 607 and 609) separated by a step 608 consisting of machining the blade to the desired dimensions.

In the foregoing, the fabrication of a variable thickness airfoil profile by using yarns having variable weight and/or count has been considered. It is possible, as a variant, to fabricate the fiber blank portion corresponding to the airfoil preform with a certain number of layers of yarns with the same weight and with a fixed count, the variation in profile thickness being obtained during machining after the first densification step or during pre-machining of the consolidated blade preform.

Further, according to the conditions of use planned for the blade, the fibers of the fiber reinforcement of the blade can be made of a material other than ceramic, for example of carbon, and the matrix can be of a material other than ceramic, for example of carbon or of a resin, the invention being of course also applicable to the manufacture of blades made of organic matrix composite material.

Figure 18:
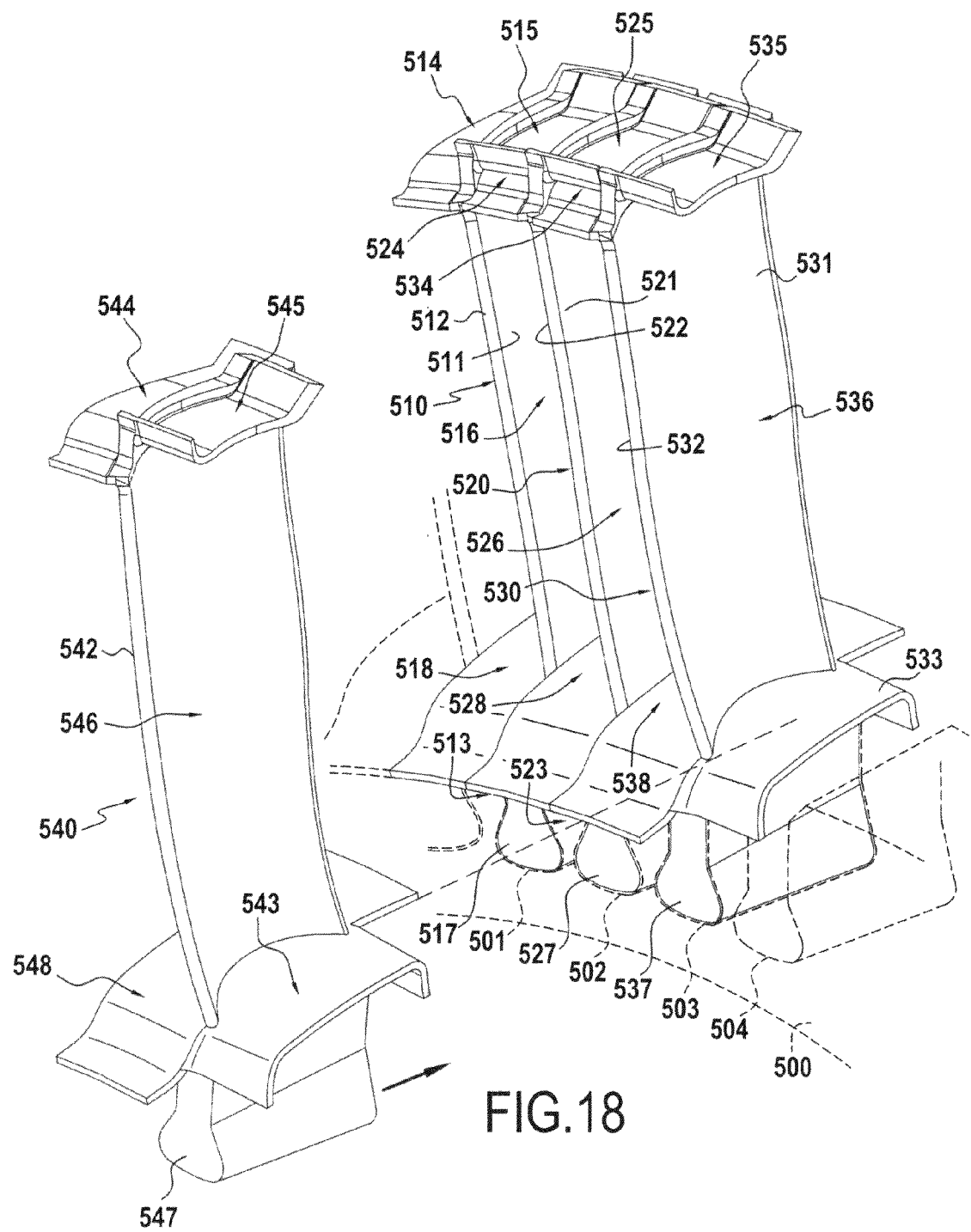
FIG. 18 shows the mounting onto a turbomachine rotor of a plurality of blades similar to that of FIG. 1.

FIG. 18 shows the mounting on a turbomachine rotor or disk 500 of a plurality of blades 510, 520, 530 and 540 exhibiting a structure similar to the blade 10 of FIG. 1. The blades 510, 520, 530 and 540 are mounted on the rotor 500 by inserting the roots 517, 527, 537 and 547 of each blade respectively into the recesses 501, 502, 503 and 504 having matching shapes provided in the periphery of the rotor. As described before for the blade 10, the airfoil 516, respectively 526, 536 and 546, of the blade 510, respectively 520, 530 and 540, includes on its surface 512 (suction face), respectively 522, 532 and 542, an inner platform portion (including covering spoilers at its ends) 518, respectively 528, 538 and 548 and a blade outer platform spoiler portion 514, respectively 524, 534 and 544. In addition, on its face 511 (pressure face), respectively 521, 531 and 541, the airfoil 516, respectively 526, 536 and 546, includes an anti-tilting wall portion 513, respectively 523, 533 and 543 and a blade outer platform wipers portion 515, respectively 525, 535 and 545.

As shown in FIG. 18, the blades nest with one another, one already-mounted blade, for example the blade 530, receiving above its anti-tilting wall portion, 533 here, the inner platform portion of the adjacent blade, here the platform portion 548 of the blade 540. Likewise, the blade 530 receives above its blade outer platform wipers portion 535 the blade outer platform spoilers portion 544 of the blade 540.

Once mounted together, each blade, here for example the blade 520, comprises on each side of its airfoil, here the airfoil 526, the functions customarily present at its radially inward end, to wit the anti-tilting function provided here by the combination of the anti-tilting wall portions 513 and 523 and the function of defining a flowpath provided here by the combination of the inner platform portions 528 and 538 as well as at its radially outward end, to wit the function of defining a flowpath provided by the combination of the outer platform spoiler portions 524 and 534 and the sealing function provided by the combination of the outer platform wipers portions 515 and 525.

The blade 10 described earlier in relation with FIG. 1 includes on the suction face of its airfoil 20 the blade platform portion 40 and the blade outer platform wipers portion 70, while it includes on the pressure of its airfoil 20 the anti-tilting wall portion 50 and the blade outer platform spoilers portion 60. According to variants of implementation, the blade inner platform and blade outer platform wipers portions can be arranged on the pressure face of the blade airfoil while the anti-tilting wall and blade outer platform spoilers portions can be arranged on the suction face of the blade airfoil. According to other variants of implementation, the distribution of the blade inner platform, blade outer platform wipers, anti-tilting wall and blade outer platform spoilers portions over the faces of the blade airfoil can be such that the airfoil comprises on one of the faces of its airfoil only one of the portions of the blade inner platform, blade outer platform wipers, anti-tilting wall and blade outer platform spoilers portions, the three other portions being arranged on the other face of the airfoil or such that these four portions are all present on the same face of the airfoil. However, for a better distribution of the masses over the blade, the blade preferably comprises two portions on one face and the two other portions on the opposite face of the airfoil.

Figure 19:
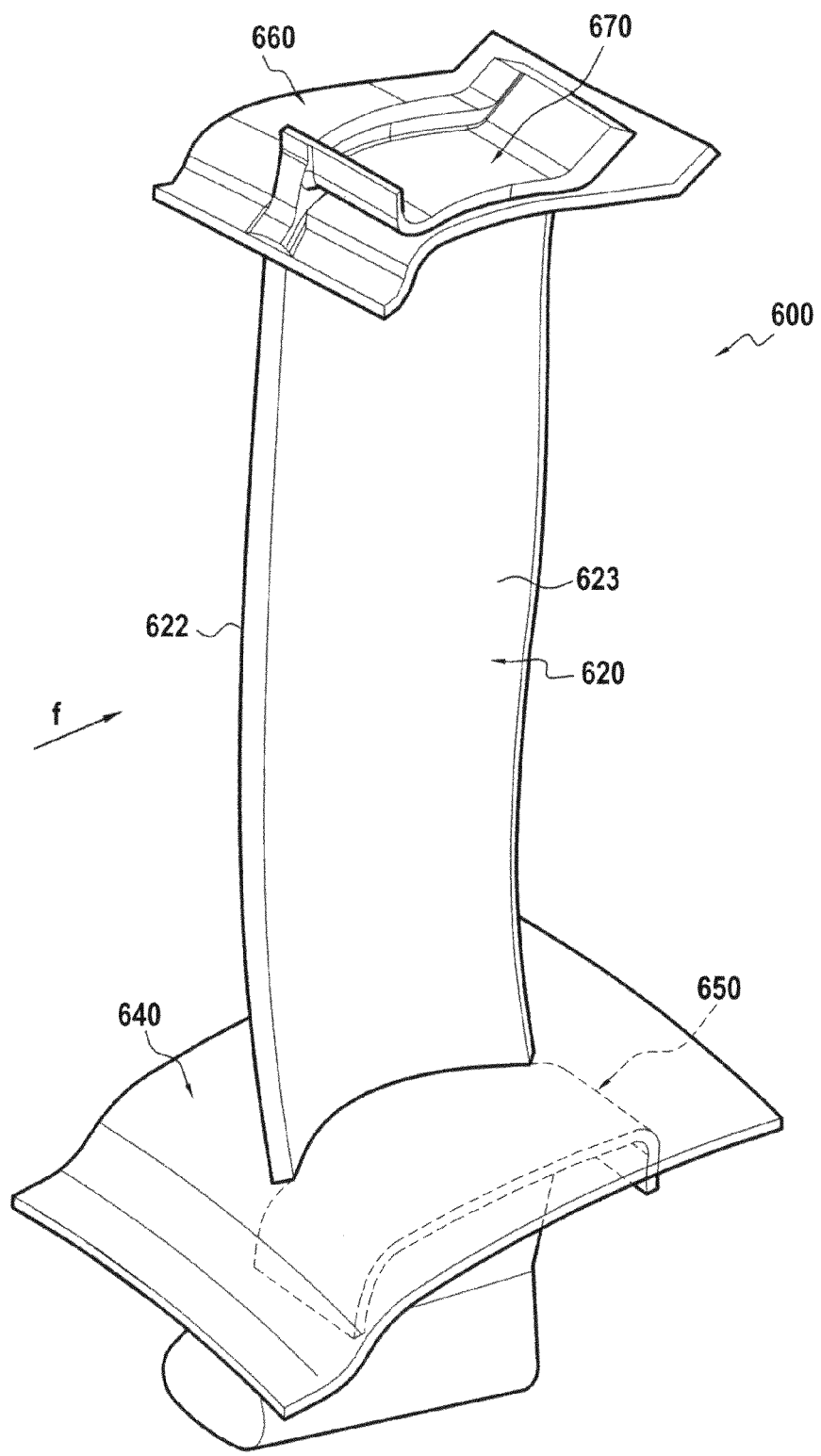
FIG. 19 is a perspective view of a turbomachine blade in conformity with another embodiment of the invention.

According to still other variations of implementation of the blade according to the invention, a portion of the elements of blade inner platform, of blade outer platform wipers, of anti-tilting wall and of blade outer platform spoilers can be present on both faces of the airfoil while certain other of these elements are present only on one face of the airfoil as described earlier. FIG. 19 illustrates such an example of a variant of implementation with a blade 600 which comprises an inner platform 640 and complete blade outer platform spoilers 660 in that they are present on both faces 622 and 623 of the airfoil 620 while only the anti-tilting wall 650 and blade outer platform wipers 670 portions are present only respectively on the face 623 of the airfoil 620. In this case, the fiber strip designed to constitute the airfoil, such as the strip 102 described earlier, and crossed at the connecting portions, such as the portions 140c and 150c described previously, by two fiber strips such as the strip 104, in order to make it possible to have independent portions of fiber strip allowing the fabrication of an inner platform and blade outer platform spoilers together with anti-tilting wall and blade outer platform spoilers portions.

Second Embodiment: CMC Vanes for Turbine Nozzle Segment

Figure 20:
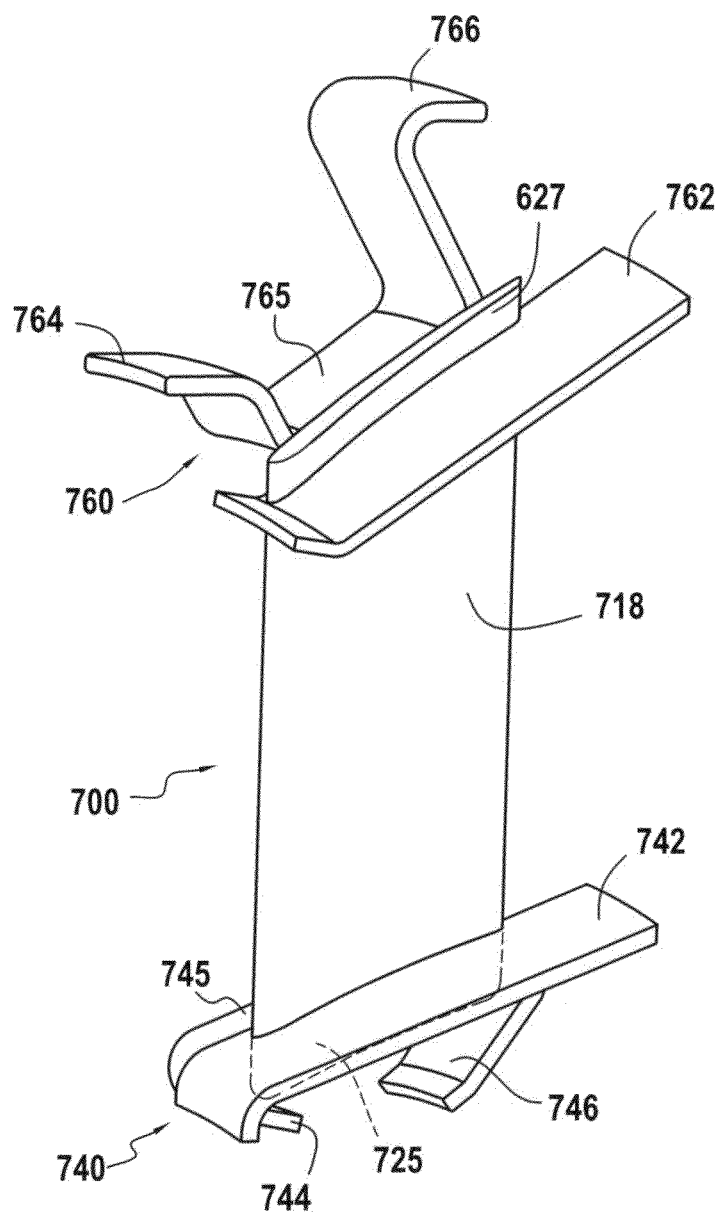
FIG. 20 is a perspective view of a turbomachine vane in conformity with one embodiment of the invention.

The invention is also applicable to various types of turbomachine vanes with incorporated inner and outer platforms, in particular vanes to be assembled together for forming segments of turbine nozzles, e.g. vanes for forming segments of a nozzle of a low-pressure (LP) turbine, such as the vane 700 shown in FIG. 20.

The vane 700 in FIG. 20 comprises an airfoil 720, an inner platform 740, and an outer platform 760, the airfoil 720 extending between the inner and outer platforms and being formed integrally therewith. The inner platform 740 and the outer platform 760 comprise portions forming respectively a flowpath delimiting inner platform portion 742 and a flowpath delimiting outer platform portion 762 which extend at the ends of the airfoil 720 on one and same side of the airfoil 720, on the side of the pressure face or of the suction face (in the example shown, on the side of the pressure face).

On the inside of the flowpath delimiting inner platform portion 742, the airfoil is extended and forms an extension 725 which is connected to the base portion 745 of an upstream hook 744 and of a downstream hook 746 located on the side of the airfoil 720 opposite to the one where the flowpath delimiting inner platform portion 742 is located. The hooks 744, 746 are connected to the extension 725 at a location which is inwardly offset with respect to the location where the flowpath delimiting inner platform portion 742 is connected to the airfoil 720. On the outside of the flowpath delimiting outer platform portion 762, the airfoil is extended and forms an extension 727 which is connected to the base portion 765 of an upstream hooking leg 764 and of a downstream hooking leg 766 located on the side of the airfoil 720 opposite to the one where the flowpath delimiting outer platform portion 762 is located. The hooking legs 764, 766 are connected to the extension 727 at a location which is outwardly offset with respect to the location where the flowpath delimiting outer platform portion 762 is connected to the airfoil 720.

The terms "inner" and "outer" are used with reference to the position or orientation with respect of the turbine axis. The terms "flowpath delimiting platform portion" designates the portion of the inner or outer platform delimiting the passage for a gas flow through the turbine.

A method of fabricating a vane 700 such as the one of FIG. 20 will now be described with reference to FIGS. 21 to 24.

FIG. 21 is a highly diagrammatic view of a fiber blank 800 which comprises two portions 802 and 804 obtained by three-dimensional weaving or multilayer weaving, only the envelopes of these two portions 802, 804 being shown. After being shaped, the portion 802 is to constitute a preform portion for the airfoil 720. After being shaped, the portion 804 is to constitute preform portions for the flowpath delimiting inner platform portion 742, the hooks 744, 746, the flowpath delimiting outer platform portion 762, and the hooking legs 762, 764.

The two portions 802 and 804 are in the form of strips extending generally in a direction X that corresponds to the longitudinal direction of the vane that is to be made. The weaving if for example performed with warp yarns extending in the direction X, it being specified that it is also possible to perform weaving with weft yarns extending in this direction. In each portion 802, 804, the warp yarns are arranged in a plurality of layers of yarns which are at least partially linked together by weft yarns of a plurality of layers of weft yarns. Various weaves may be used, for example interlock type, multi-satin type or multi-plain type weaves. Reference may be made to document WO 2006/136755.

The strip 802 may present a varying thickness that is determined as a function of the profile of the airfoil of the vane that is to be made and has a width selected as a function of the length of the flat developed profile of the airfoil. Variation in the thickness of the strip 802 along its length is obtained by using warp yarns of varying weight. In a variant, or in addition, it is possible to vary the count of the warp yarns (number of yarns per unit length in the weft direction), a smaller count making greater thinning possible when shaping the preform.

The strip 804 is of substantially constant thickness determined as a function of the thickness of the flowpath delimiting inner and outer platform portions as well as of the thickness of the hooks and hooking legs. The strip 804 has a width corresponding to the longer flat developed profile of the flowpath delimiting inner and outer platform portions and of the hooks and hooking legs of the vane to be made. The strip 804 has a first portion 804a extending along and beside a first face 802a of the strip 802, a second portion 804b extending along and beside the second face 802b of the strip 802, and a third portion 805a extending along and beside the first face 802a of the strip 802.

The portions 804a and 804b of the strip 804 are connected together by a connection portion 840c that crosses the strip 802 at a first crossing location with the strip 804 emerging on opposite faces of the strip 802 at locations which are mutually offset in the longitudinal direction of the blank and which are located at levels corresponding respectively to the locations of the hooks and of the flowpath delimiting inner platform portion of the vane to be made. The portions 804b and 805a of the strip 804 are connected together by a connection portion 860c that crosses the strip 802 at a second crossing location with the strip 804 emerging on opposite faces of the strip 802 at locations which are mutually offset in the longitudinal direction of the blank and which are located at levels corresponding respectively to the locations of the flowpath delimiting outer platform portion and of the hooking legs of the vane to be made. In addition, the connection portions 840c, 860c cross the strip 802 forming non-zero angles relative to a plane normal to the direction X, in order, in the example shown, to respect the geometry of the vane to be made at the level of the inner and outer platforms.

The strips 802 and 804 are woven simultaneously without any linking between the strip 802 and the portions 804a, 804b, and 805a of the strip 804. A plurality of successive blanks 800 may be woven continuously in the direction X. It is also possible to weave simultaneously a plurality of parallel rows of blanks 800.

FIGS. 22 to 24 show highly diagrammatically how a fiber preform 900 of shape close to that of the vane 700 that is to be made can be obtained from the fiber blank 800.

In the longitudinal direction, the strip 802 is cut at two ends to leave a portion 820 for the making of a preform of the airfoil of the vane to be made, which portion is extended at its ends to form an inner extension 805 and an outer extension 807 (FIG. 22).

The strip 804 is cut to leave a segment 850a on the side of the first crossing location which is located on the face 802a of the strip 802, a segment 840a on the side of the first crossing location which is located on the face 802b of the strip 802, a segment 860a on the side of the second crossing location which is located on the face 802b of the strip 802 and a segment 870a on the side of the second crossing location which is located on the face 802a of the strip 802.

The lengths of the segments 840a and 860a are selected as a function of the width of the flowpath delimiting inner and outer platform portions of the vane to be made. The lengths of the segments 850a and 870a are selected as a function of the widths of the hooks and hooking legs of the vane to be made. The lengths of the segments 840a and 850a are substantially equal to each other as well as the lengths of the segments 860a and 870a.

Because there is no linking with the strip 802, the segments 840a and 850a may be folded out on the opposite sides of the portion 820, as well as the segments 860a and 870a, forming plates 840, 850 860 and 870 (FIG. 23). After possible cutting of end portions, the lengths of the plates 840, 860 correspond respectively to the lengths of the flat developed profiles of the flowpath delimiting inner and outer platform portions of the vane to be made, whereas the lengths of the plates 850, 850 correspond respectively to the lengths of the flat developed profiles of the hooks and hooking legs of the vane to be made. The width of the strip 804 if thus selected as a function of the larger of the lengths to be given to the plates 840, 850, 860 and 870, the plates of smaller length being obtained after cutting of excess portions as indicated above.

The fiber preform 900 of the vane to be made is subsequently obtained by molding within a shaping tool with the portion 820 being deformed to obtain the profile of the airfoil 720 of the vane, the plates 840, 860 being deformed to obtain forms respectively similar to the ones of the flowpath delimiting inner and outer platform portions 742, 762 of the vane, the plate 850 being deformed to obtain a form similar to the one of the hooks 744, 746, and the plate 870 being deformed to obtain a form similar to the one of the hooking legs 764, 766. A vane preform 900 is thus obtained (FIG. 24) with preform portions 942, 962 of the flowpath delimiting inner and outer platform portions 942, 962, hook and hooking legs preform portions 944, 946, 964, 966 and airfoil preform portion 920.

Figure 25:
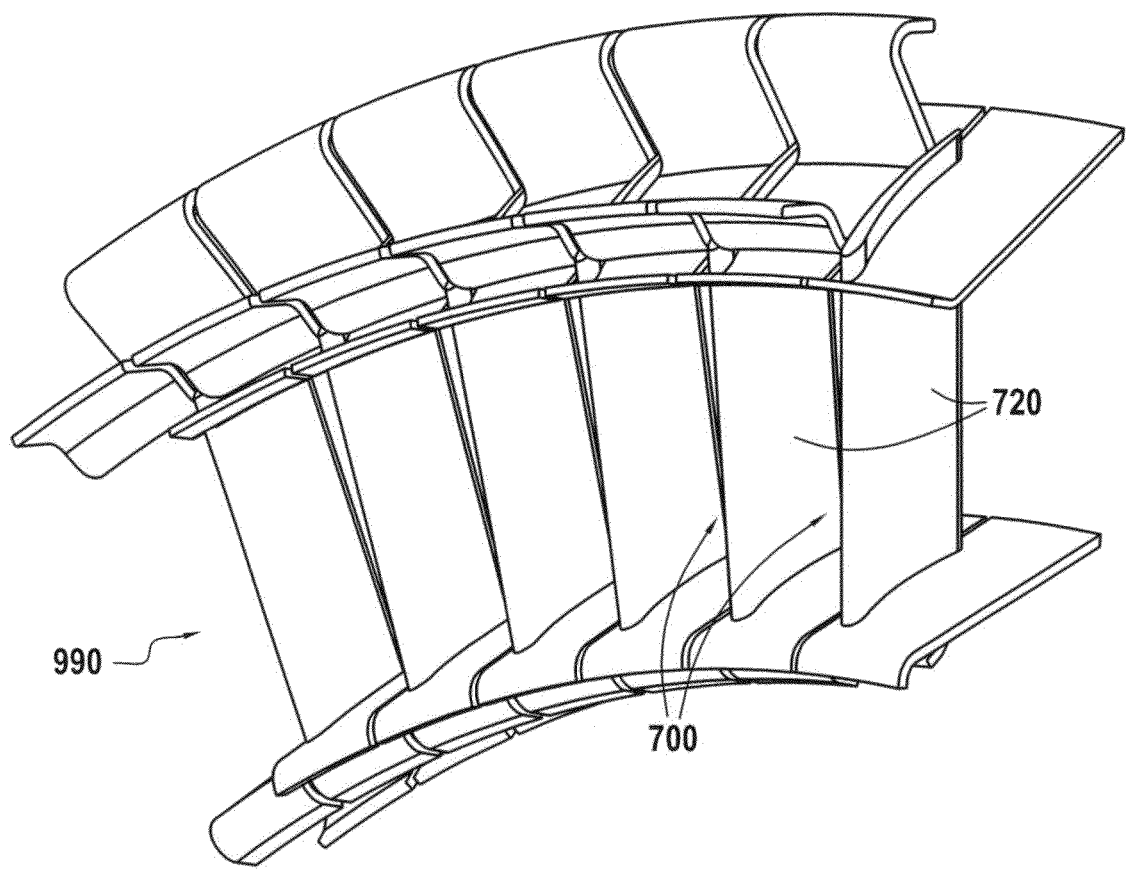
FIG. 25 is a perspective view of a turbine nozzle segment obtained by connecting together a plurality of vanes such as shown by FIG. 20.

A turbine nozzle segment 990 such as shown by FIG. 25 is obtained by assembling and connecting together unitary vanes similar to the one of FIG. 20 which are obtained by densifying a preform such as the one of FIG. 24. It shall be noted that the steps for shaping a vane preform 900 from a fiber blank 800 may be carried out after the fibers of the fiber blank 800 have been processed and impregnated with a consolidation resin such as now described with reference to FIG. 26 which shows successive steps of a method for fabricating a multi-airfoil turbine nozzle segment in CMC material.

In step 1001, an assembly of fiber strips is woven by three-dimensional weaving, comprising a plurality of fiber blanks 700 oriented for example in the warp direction, as shown by FIG. 18. Weaving is performed with yarns made of ceramic material or carbon.

In step 1002, the assembly of fiber strips is processed to eliminate the oiling and oxide present on the fibers.

In step 1003, a thin layer of interphase coating is formed on the fibers of the fiber strip by chemical vapor infiltration (CVI). The interphase coating material is constituted for example by pyrolytic carbon (PyC), boron nitride (BN), or boron-doped carbon (BC). The thickness of the formed layer is preferably comprised between 10 nanometers and 100 nanometers.

Steps of fiber processing and of formation of interphase coating are described in U.S. Pat. No. 5,071,679.

In step 1004, the assembly of fiber strips is subsequently impregnated with a consolidation composition, typically a carbon precursor resin or a ceramic precursor resin that might optionally be dissolved in a solvent.

After drying (step 1005), the individual fiber blanks are cut out (step 1006), as shown in FIG. 21.

In step 1007, a fiber blank as cut out in this way is shaped (as shown in FIGS. 22 and 23) and placed in a tooling, e.g. a graphite tooling, for shaping the airfoil preform portion, the preform portions for the platform portions forming gas passage inner and outer wall portions and the hooks and hooking legs preform portions.

Thereafter, the resin is cured (step 1008) and the pyrolyzed (step 1009). Curing and pyrolyzing can follow one another by progressively raising the temperature in the mold.

After pyrolysis, a fiber preform is obtained that has been consolidated by the residue of the pyrolysis. The quantity of consolidation resin is selected so that the pyrolysis residue bonds the fibers of the preform together sufficiently to enable the preform to be handled while conserving its shape and without assistance from tooling.

A second interphase layer is formed by CVI (step 1010). The second interphase layer may be of a material selected from PyC, BN, and BC, and its thickness is preferably not less than 100 nm. Making an interphase out of two layers is described in document EP 2,154,119.

Thereafter the consolidated preform is densified with a ceramic matrix for example by CVI. The matrix may be made of SiC or may be a self-healing matrix comprising matrix phases of pyrolytic carbon PyC, of boron carbide $B_4C$ or of a ternary system Si—B-C as described in particular in U.S. Pat. Nos. 5,246,756 and 5,965,266. Other types of matrix materials may be used, in particular refractory oxides, e.g. alumina, in particular for CMC materials of the oxide/oxide type.

Densification may then be performed by a liquid process, namely by impregnation with a liquid precursor of the matrix material and transformation of the precursor by heat treatment or impregnation by a composition containing ceramic powder, the matrix being then obtained by sintering.

Densification is performed in two successive steps (steps 1011 and 1013) that are separated by a step 1012 of machining the vane to the desired dimensions. A vane is then obtained such as the one of FIG. 20.

The following step consists in assembling and connecting together a plurality of vanes to obtain a multi-airfoil CMC turbine nozzle segment such as the one of FIG. 25. The vanes are connected together by brazing along the longitudinal edges of the platform portions forming gas passage wall portions, and of the hooks and hooking legs. In a variant, brazing could be performed along overlapping portions of the platform portions forming gas passage wall portions. Brazing of pieces in CMC material is known. Reference may be made for instance to documents FR 2,664,518 and FR 2,745,808 the content of which is herein incorporated, these documents describing various nickel based brazing compositions containing also titanium, silicon and possibly other metals such as copper or chromium.

Figure 27:
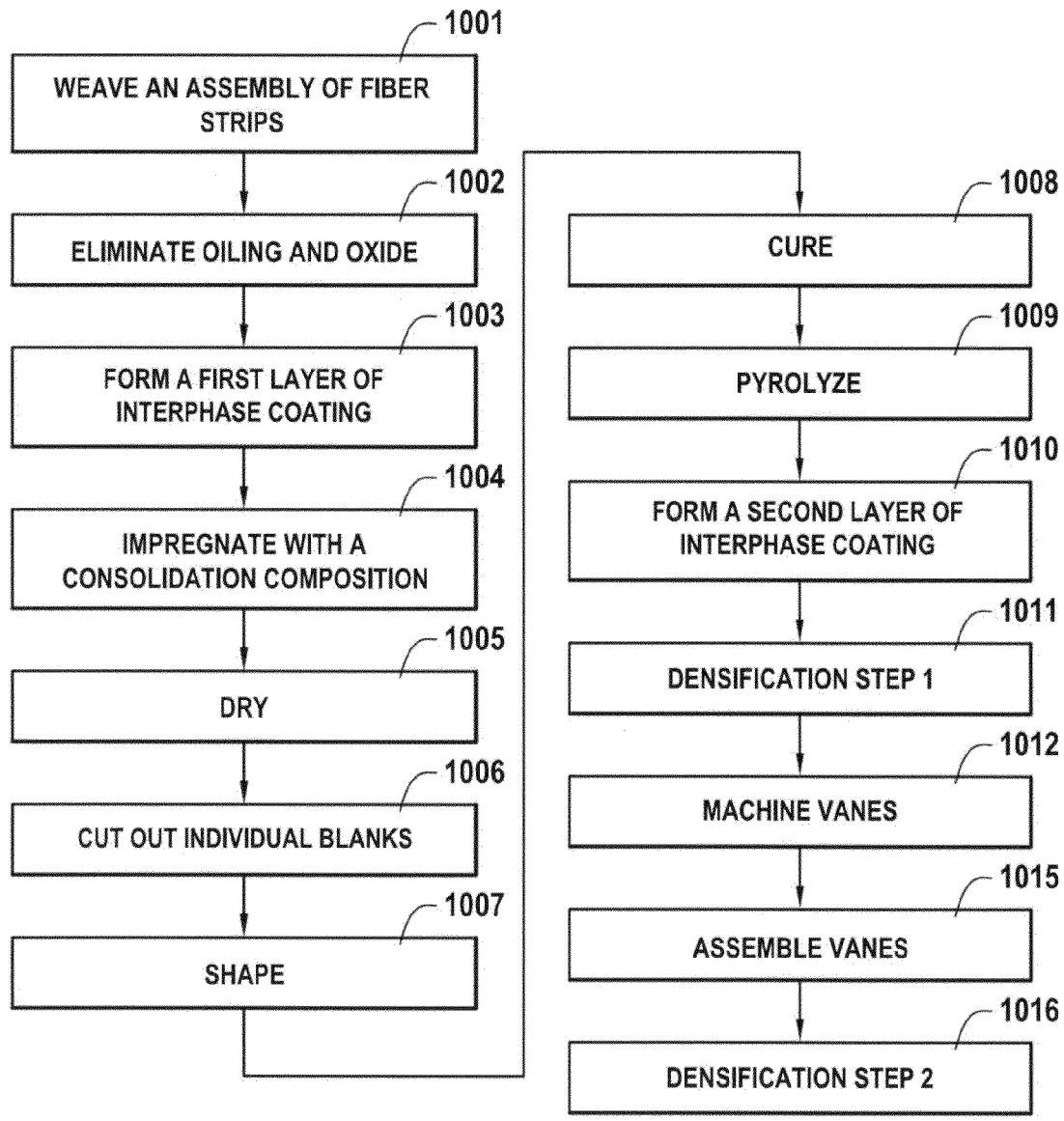
FIG. 27 shows successive steps in another implementation of a method of making a turbomachine nozzle segment in accordance with the invention.

FIG. 27 shows successive steps of another method of fabricating a turbine nozzle segment in CMC material. Steps 1001 to 1012 are identical to those of the method of FIG. 23.

After the machining step 1012 a plurality of vanes are held together to form a nozzle segment (step 1015). The assembling of the vanes may be performed by means of a tooling maintaining the vanes side n by side and/or by pre-ceramic bonding, namely by bonding using a ceramic precursor resin, for example a polysilane, polysiloxane, polysilazane, polycarbosilane or silicone resin, as known in itself. A second densification or co-densification step is performed (step 1016) which is similar to step 1013 of the method of FIG. 26, but performed on a complete nozzle segment. When assembling by pre-ceramic bonding has been performed, the curing and the pyrolysis of the resin for transformation into ceramic may be performed during the temperature rising in view of the second densification step.

Figure 28:
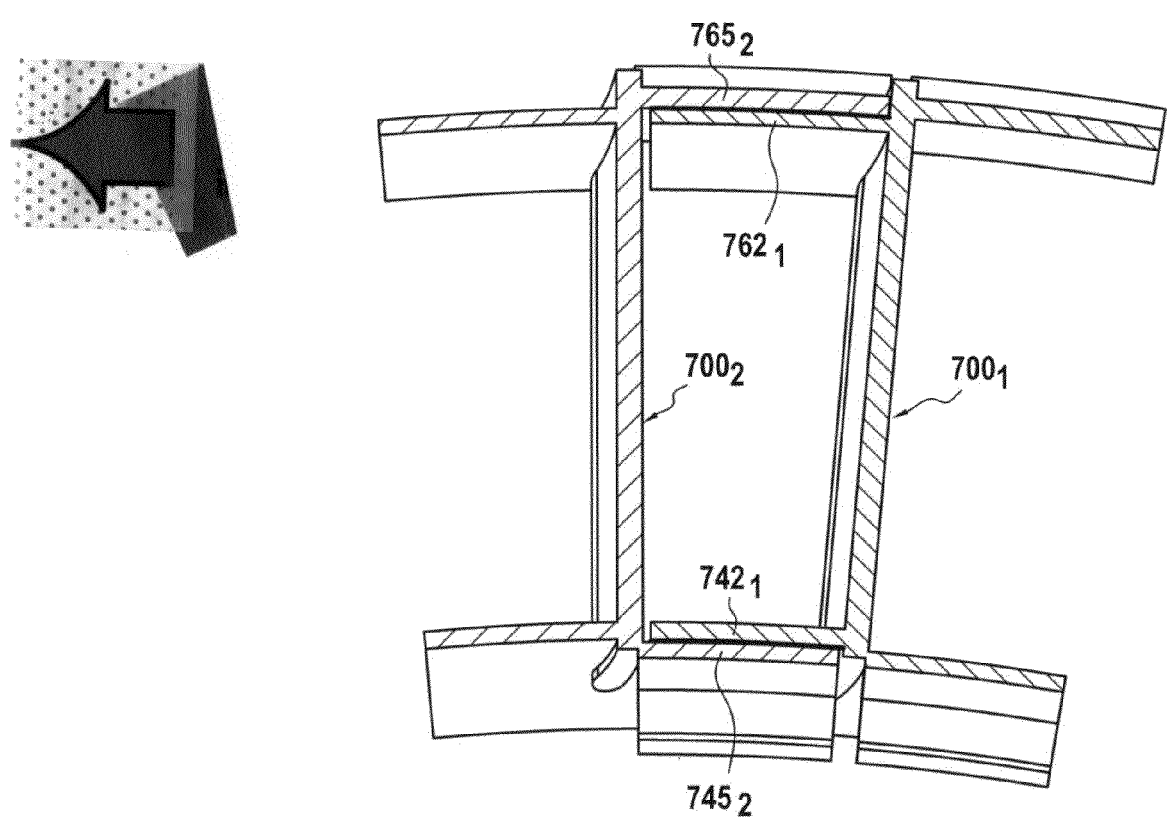
FIG. 28 is a partial view in cross-section of the turbine nozzle segment of FIG. 25.

It shall be noted that the unitary vanes are assembled together by inserting the flowpath delimiting inner platform portion $742_1$ of a first vane $700_1$ on the outer side of the base portion $745_2$ of the hooks of a second adjacent vane $700_2$ and by inserting the flowpath delimiting outer platform portion $762_1$ of the first vane $700_1$ on the inner side of the base portion $765_2$ of the hooking legs of the second adjacent vane $700_2$ (FIG. 28). The offset in longitudinal direction between the locations of connection to the vane airfoil of the flowpath delimiting inner platform portion and of the hooks is selected to be approximately equal or slightly larger than the thickness of the flowpath delimiting inner platform portion. Similarly, the offset in longitudinal direction between the locations of connection to the vane airfoil of the flowpath delimiting outer platform portion and of the hooking legs is selected to be approximately equal or slightly larger than the thickness of the flowpath delimiting outer platform portion. For connecting together unitary vanes, a connection by brazing and/or co-densification may then be achieved between the inner surface of the flowpath delimiting inner platform portion $742_1$ of a first vane $700_1$ and the base portion $745_2$ of hooks of a second adjacent vane $700_2$, as well as between the outer surface of the flowpath delimiting outer platform portion $762_1$ of the first vane $700_1$ and the base portion $765_2$ of hooks of the second vane $700_2$, as diagrammatically shown by FIG. 28. In addition, upon machining of the unitary vanes, the end edges of the flowpath delimiting inner and outer platform portions could be machined to substantially adjust to the profile of the adjacent airfoil of an adjacent vane.

After a plurality of turbine nozzle segments 990 have been fabricated, they are mounted in a low pressure turbine casing of a turbomachine, to form a turbine nozzle 1100.

Figure 29:
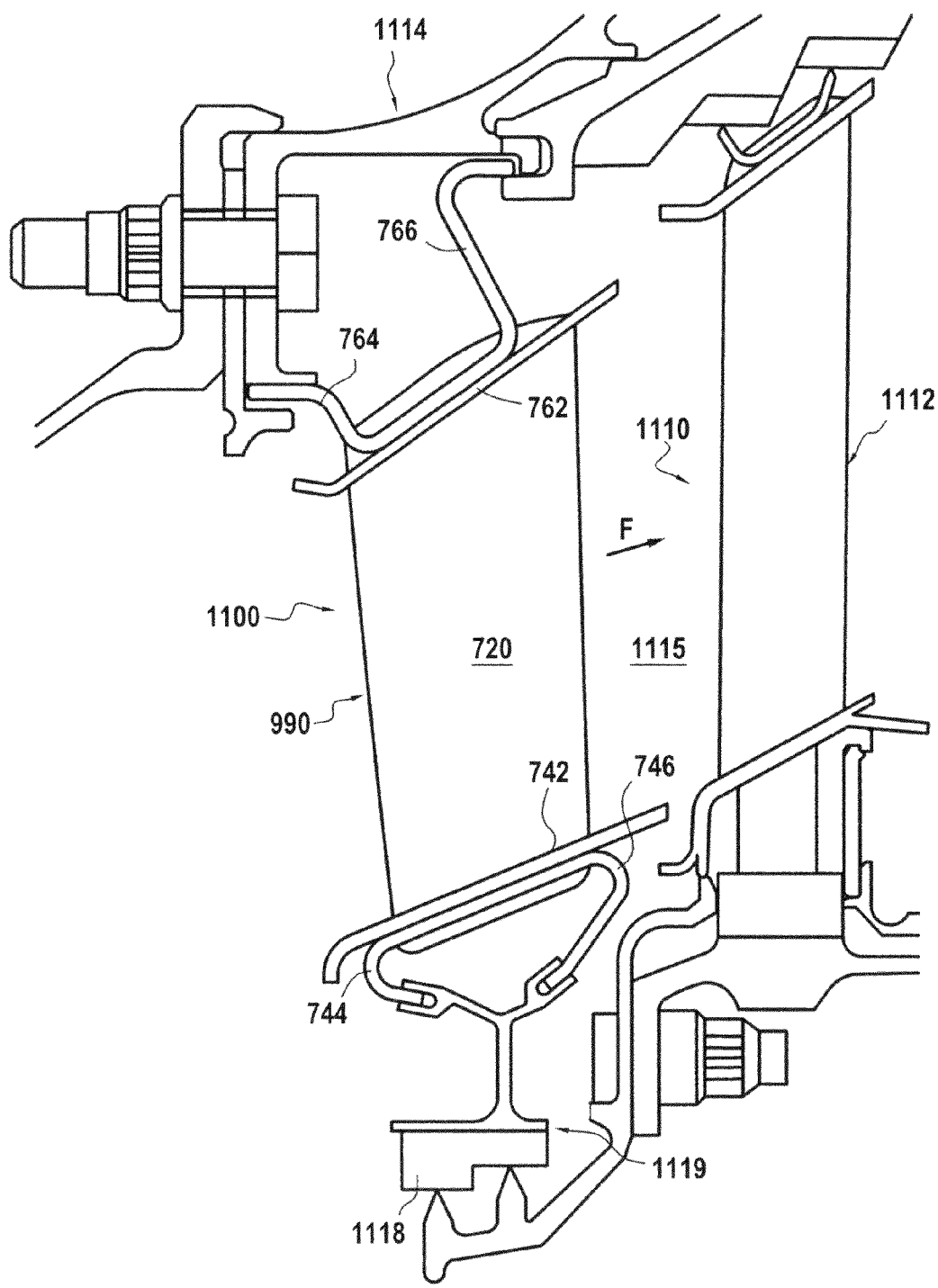
FIG. 29 is a very diagrammatic and partial half axial section view of a low-pressure turbine of a turbomachine comprising a turbine nozzle in CMC material.

FIG. 29 partially shows a multi-stage low pressure turbine of a turbomachine, which turbine comprises a plurality of turbine nozzles 1100 alternating with mobile wheels 1110 in the direction of the gas flowing through the turbine (arrow F), the turbine nozzles being mounted in a turbine casing 1114.

The mobile wheels 1110 carry a plurality of blades 1112. The turbine nozzle 1100 shown on FIG. 29 is formed of a plurality of adjoining nozzle segments 990 and is mounted in the turbine casing by means of the hooking legs 764, 766 of the vanes 700 from which the nozzle segments are formed.

The platform portions 742, 762 of the inner and outer platforms of the vanes 700 delimit the gas flow passage 1115 through the turbine nozzle 1100.

On the inside, a ring 1116 supporting an abradable material 1118 is supported formed by the hooks 744, 746 of the vanes from which the nozzle segments are formed. The abradable material 1118 cooperates with wipers carried by a mobile wheel adjacent the turbine nozzle 1100, in a well-known manner.

Other Embodiments

In the second embodiment described above, hooks are formed on the inside of inner platforms in order to carry a ring supporting abradable material. Instead of hooks, overhangs could be formed.

The second embodiment described above relates to CMC vanes and nozzle segments for a low-pressure turbine. The invention is similarly applicable to CMC turbine nozzles for turbine spools other than low-pressure turbines as well as to compressor stators, in particular in compressor stages which in use are exposed to high temperatures.

Figure 30:
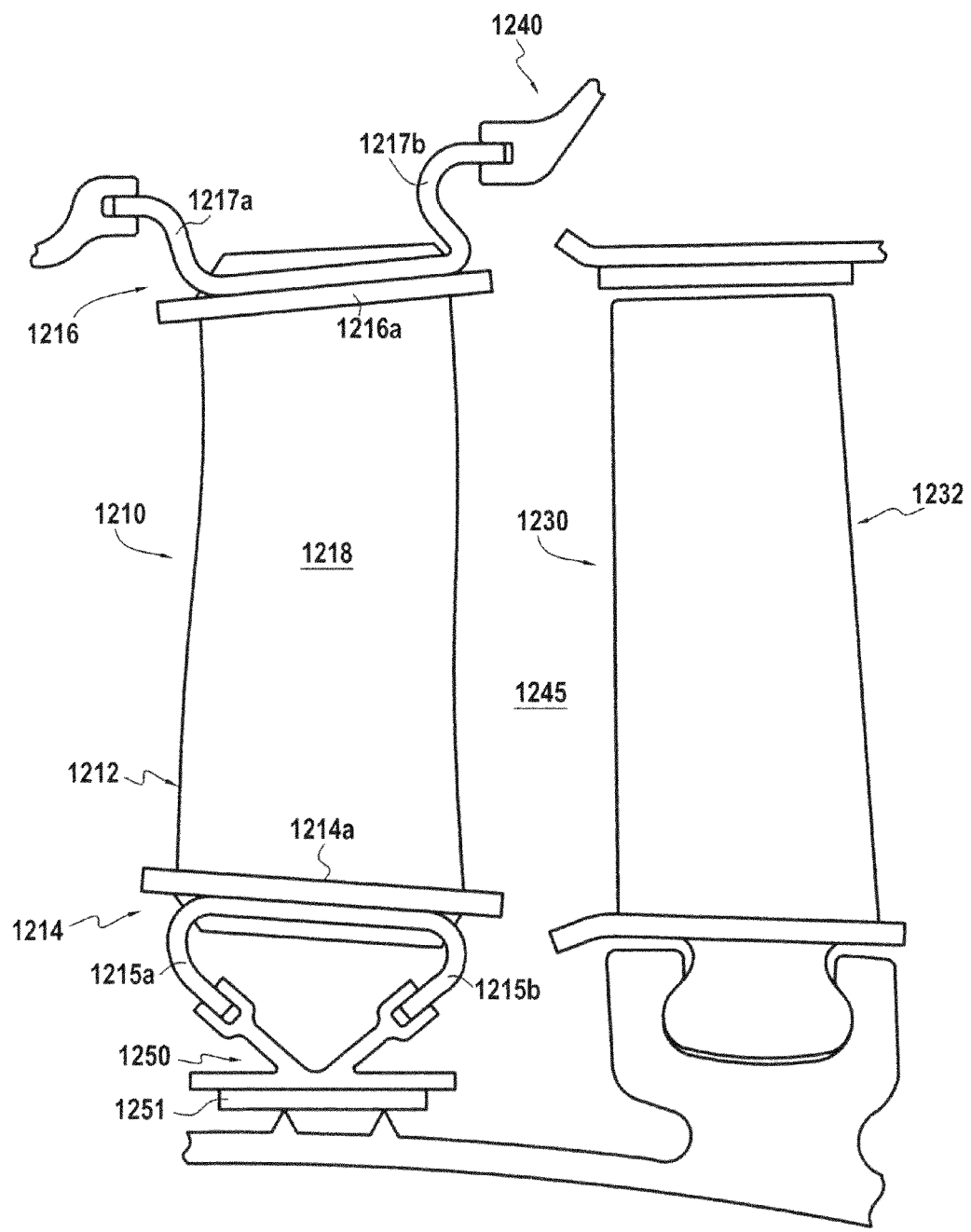
FIG. 30 is a very diagrammatic and partial half axial section view of a compressor of a turbomachine comprising a compressor stator in CMC material.

A multi-stage turbomachine compressor, for example of an aeroengine is partially and very diagrammatically shown by FIG. 30. The compressor, for example a high-pressure compressor, comprises a plurality of stators 1210 alternating with rotating wheels 1230 and mounted in a compressor casing 1240.

Each rotating wheel carries a plurality of blades 1232.

At least one of the compressor stators, e.g. the stator 1210 of FIG. 30 is formed by assembling stator segments 1212 in CMC material. Each stator segment is formed by assembling unitary single-airfoil vanes and comprises an inner platform assembly 1214, an outer platform assembly 1216 and airfoils 1218 extending between the inner and outer platform assemblies and formed integrally therewith. The platform assemblies 1214 and 1216 comprise portions forming gas flow passage inner and outer wall portions 1214a and 1216a which delimit the passage 1245 for the air flow through the compressor at the level of the compressor stator 1210.

On the inside, each platform assembly 1214 includes hooks 1215a, 1215b, whereas, on the outside, each platform assembly 1216 includes hooking legs 1217a, 1217b.

The stator segments are supported in the compressor casing 1240 by means of the hooking legs 1217a, 1217b whereas the hooks 1215a, 1215b support a metallic ring 1250 carrying abradable material 1251. The abradable material 1251 cooperate with wipers carried by a mobile wheel adjacent the compressor stator in a well-known manner.

The single-airfoil vanes constituting each stator segment are made and assembled together as described above for unitary vanes forming turbine nozzle segments.

Here above, the fabrication of a compressor stator in a CMC material has been envisaged. When the temperatures to which the compressor stator is exposed in use are lower, in particular in the upstream stages of a compressor, an organic matrix composite (OMC) material may be used, made with fibers for instance of carbon or glass and with a polymer matrix.

A segment of OMC material compressor stator is obtained by assembling single-airfoil vanes.

Figure 26:
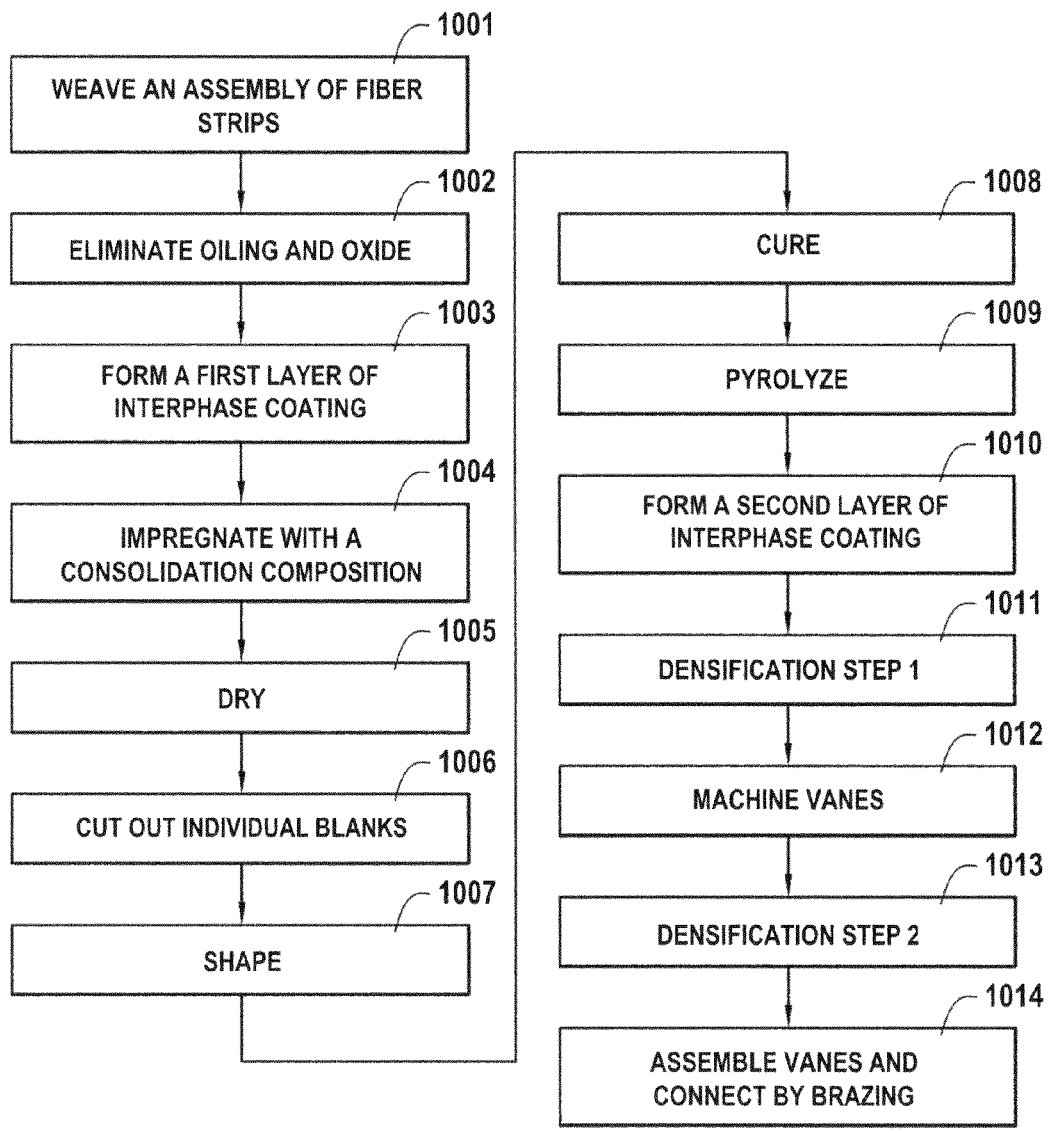
FIG. 26 shows successive steps in an implementation of a method of making a turbomachine nozzle segment in accordance with the invention.

After weaving an assembly of fiber strips, cutting out of individual blanks and shaping by means of a shaping tooling, as in steps 1001, 1006 and 1007 of the method of FIG. 26, each vane preform obtained is impregnated by a resin by injection or infusion while being kept in the shaping tooling. The resin is cured by heat treatment to obtain a partially densified consolidated vane preform. After machining, a plurality of consolidated vane preforms are assembled together and maintained in a tooling. The assembled consolidated preforms are co-densified, the co-densification being achieved by performing at least one cycle of resin impregnation and curing. A final machining may be performed. The resin used for consolidation and co-densification is a resin precursor of a polymer matrix such as an epoxide, bismaleimide (BMI) or polyimide resin, for example.

The invention claimed is:

1. A method for fabricating a turbomachine blade or vane made of composite material including a fiber reinforcement densified by a matrix, the method comprising:

fabricating, by three-dimensional weaving, a one-piece fiber blank;

shaping of the fiber blank to obtain a one-piece fiber preform having a first portion constituting at least an airfoil preform, the airfoil exhibiting two faces, and at least one second portion present only on one of the faces of the airfoil preform, said second portion constituting a preform of a portion of at least one of the following elements: a preform of a flowpath delimiting outer portion of an inner platform, a preform of an inner portion of an inner platform, a preform of a flow path delimiting inner portion of an outer platform, and a preform of an outer portion of an outer platform; and densifying the preform by a matrix to obtain a blade or vane made composite material having a fiber reinforcement consisting of the preform and densified by the matrix, and forming a single part with at least a portion of one of the following elements: a flowpath delimiting outer portion of an inner platform, an inner portion of an inner platform, a flowpath delimiting inner portion of an outer platform, and an outer portion of an outer platform, wherein, in the longitudinal direction of the fiber blank that corresponds to the longitudinal direction of the blade or vane that is to be made, the fiber blank comprises a first set of a plurality of layers of yarns that are linked together to form a first portion of the blank that corresponds to the first portion of the preform, and a second set of a plurality of layers of yarns that are linked together at least locally to form at least one second portion of the blank that corresponds to said at least one second portion of the preform, the yarns of the first set of layers of yarns being not linked to the yarns of the second set of layers of yarns, and yarns of the second set of layers of yarns crossing through the first set of layers of yarns at the or each second portion of the blank.

2. A method according to claim 1, wherein the fiber blank is woven with a second continuous set of layers of yarns and the shaping of the fiber blank comprises eliminating portions of the second set of layers of yarns external to the or each second portion of the fiber blank by cutting them away.

3. A method according to claim 1, wherein, in the first portion of the fiber blank and in a direction that corresponds to the direction extending along the profile of an airfoil of varying thickness in the blade or vane that is to be made, the number of layers of yarns in the first set of layers of yarns is constant.

4. A method according to claim 3, wherein the yarns of the first set of yarns are of varying weights.

5. A method according to claim 3, wherein the yarns of the first set of yarns are of varying counts.

6. A method according to claim 1, wherein a strip is fabricated by three-dimensional weaving that includes a succession of fiber blanks.

7. A method according to claim 6 wherein the blanks are woven with the longitudinal direction of the blade or vane to be fabricated in the weft direction.

8. A method according to claim 6 wherein the blanks are woven with the longitudinal direction of the blade or vane to be fabricated in the warp direction.

9. A method for fabricating a turbomachine blade of composite material including a fiber reinforcement densified by a matrix, the method comprising:

fabricating, by three-dimensional weaving, a one-piece fiber blank;

shaping of the fiber blank to obtain a one-piece fiber preform having a first portion constituting an airfoil and blade root preform, the blade airfoil exhibiting two faces each connecting a leading edge with a trailing edge, and at least one second portion present only on one of the faces of the blade airfoil, said second portion constituting a preform of at least one of the following elements: blade inner platform, blade anti-tilting wall, blade outer platform spoilers and blade outer platform wipers; and densifying the preform by a matrix to obtain a blade made of composite material having a fiber reinforcement consisting of the preform and densified by the matrix, and forming a single part with at least a portion of one of the following elements: blade inner platform, blade anti-tilting wall, blade outer platform spoilers and blade outer platform wipers, present only on one of the faces of the blade airfoil, wherein, in the longitudinal direction of the fiber blank corresponding to the longitudinal direction of the blade to be fabricated, the fiber blank has a first set of several layers of yarns which are interlinked to constitute a first portion of the blank corresponding to the preform of the airfoil and blade root, and a second set of several layers of yarns which are interlinked at least locally so as to constitute on one of the faces of the blade airfoil at least the second portion of the blank corresponding to a preform of one portion of at least one of the following element: blade inner platform, blade anti-tilting wall, blade outer platform spoilers and blade outer platform wipers, in that the yarns of the first set of yarn layers are not linked to the yarns of the second set of yarn layers, and in that the first set of yarn layers is crossed by yarns from the second set of yarn layers at the or at each second portion of the blank.

10. A method according to claim 9, wherein, in the longitudinal direction corresponding to the longitudinal direction of the fiber blank to be fabricated, the fiber blank includes:

a first set of several yarn layers which are interlinked to form a first portion of the blank corresponding to the airfoil and blade root preform;

a second set of several yarn layers which are interlinked at least locally to form on one of the faces of the airfoil at least one second portion of the blank corresponding to the preform of a blade inner platform portion and/or of a blade outer platform spoilers portion and at least one third portion of the blank corresponding to a preform of a blade anti-tilting wall portion and/or of a blade outer platform wiper portion;

the yarns of the first set of yarn layers being linked to the yarns of the second set of yarn layers, and the first set of yarn layers being crossed by yarns of the second set of yarn layers at the or at each second portion of the fiber blank and at the or at each third portion of the fiber blank.

11. A method according to claim 10, wherein the fiber blank is woven with a second and a third continuous sets of yarn layers and the shaping of the fiber blank includes the elimination by cutting out of portions of the second set of yarn layers outside of the or of each second portion of the fiber blank and of the or of each third portion of the fiber blank.

12. A method according to claim 9, wherein, in the longitudinal direction corresponding to the longitudinal direction of the fiber blank to be fabricated, the fiber blank includes:

a first set of several layers of yarns which are interlinked to form a first portion of the blank corresponding to the airfoil and blade root preform;

a second set of several layers of yarns which are interlinked at least locally to form on one of the faces of the airfoil at least one second portion of the blank corresponding to the preform of a portion of a least one of the following elements: blade inner platform, blade anti-tilting wall, blade outer platform spoilers and blade outer platform wipers and a third portion of the blank corresponding to the preform of all or a portion of said elements other than that constituted by the second portion; and a third set of several layers of yarns which are interlinked at least locally to form on one face of the airfoil at least one fourth portion of the blank corresponding to the preform of all or part of one of said elements other than that constituted by the second and third portions and a fifth portion of the blank corresponding to the preform of all or a portion of one of said elements other than that constituted by the second, third and fourth portions;

the yarns of the first set of yarn layers being not linked to the yarns of the second and third sets of yarn layers, and the first set of yarn layers being crossed by yarns of the second and third sets of yarn layers at the second, third, fourth and fifth portions of the fiber blank.

13. A method according to claim 12, wherein the fiber blank is woven with a second and a third continuous set of yarn layers and the shaping of the fiber blank includes the elimination by cutting out of portions of the second and third sets of yarn layers outside of the second, third, fourth and fifth portions of the fiber blank.

14. A method according to claim 9, wherein, in the first portion of the fiber blank and in a direction corresponding to that extending along the profile of an airfoil of variable thickness in the blade to be fabricated, the number of yarn layers in the first set of yarn layers is constant.

15. A method according to claim 9, wherein a strip is made by three-dimensional weaving, including a succession of fiber blanks.

16. A method for fabricating a turbomachine vane made of composite material including a fiber reinforcement densified by a matrix, the method comprising:

fabricating, by three-dimensional weaving, a one-piece fiber blank;

shaping of the fiber blank to obtain a one-piece fiber preform having a first portion constituting an airfoil preform, the vane airfoil exhibiting two faces each connecting a leading edge and a trailing edge, at least a second portion present only on one of the faces of the vane airfoil preform, said second portion constituting a preform of a flowpath delimiting inner platform portion or of inner platform hooks or overhangs, and at least a third portion present only on one face of the vane airfoil preform, said third portion constituting a preform of a flowpath delimiting outer platform portion or of outer platform hooking legs; and densifying the preform by a matrix to obtain a vane made of composite material having a fiber reinforcement consisting of the preform and densified by the matrix, and forming a single part with at least one of the following elements: flowpath delimiting inner platform portion and inner platform hooks or overhangs, and at least one of the following elements: flowpath delimiting outer platform portion and outer platform hooking legs, wherein, in the longitudinal direction of the fiber blank that corresponds to the longitudinal direction of the vane that is to be made, the fiber blank comprises:

a first set of a plurality of layers of yarns that are linked at least partially together to form a first portion of the blank that corresponds to the first portion of the preform, and a second set of a plurality of layers of yarns that are linked together at least locally to form a second portion of the blank that corresponds to the second portion of the preform and to form a third portion of the blank that corresponds to the third portion of the preform, the yarns of the first set of layers of yarns being not linked to the yarns of the second set of layers of yarns, and the second set of layers of yarns crossing through the first set of layers of yarns at first and second locations corresponding to the locations of the second and third portions of the blank, respectively.

17. A method according to claim 16, wherein, at the second crossing location, the second set of yarn layers emerges on opposite faces of the first set of yarn layers at locations which are mutually offset in the longitudinal direction of the blank, and the forming of the blank includes folding out portions of the second set of yarn layers extending on the opposite faces of the first set of yarn layers at the second crossing location to form respectively a flowpath delimiting outer platform portion preform and an outer platform hooking legs preform which are mutually offset in the longitudinal direction.

18. A method according to claim 16, wherein, at the first crossing location, the second set of yarn layers emerges on opposite faces of the first set of yarn layers at locations which are mutually offset in the longitudinal direction of the blank, and the forming of the blank includes folding out portions of the second set of yarn layers extending on the opposite faces of the first set of yarn layers at the first crossing location to form respectively a flowpath delimiting inner platform portion preform and an inner platform hooks or overhangs preform which are mutually offset in the longitudinal direction.

19. A method for fabricating a turbomachine turbine nozzle segment or compressor stator segment out of a composite material comprising fiber reinforcement densified by a matrix, the method comprising:
   making a plurality of turbine nozzle vanes or compressor stator vanes each including an inner platform, an outer platform and an airfoil extending between the inner and outer platforms and forming one piece therewith, the making of each vane comprising:
   making a one-piece fiber blank by three dimensional weaving;
   shaping of the fiber blank to obtain a one-piece fiber preform having a first portion constituting an airfoil preform, the vane airfoil exhibiting two faces each connecting a leading edge and a trailing edge, at least a second portion present only on one of the faces of the vane airfoil preform, said second portion constituting a preform of a flowpath delimiting inner platform portion or of inner platform hooks or overhangs, and at least a third portion present only on one face of the vane airfoil preform, said third portion constituting a preform of a flowpath delimiting outer platform portion or of outer platform hooking legs; and
   densifying the preform by a matrix to obtain a vane made composite material having a fiber reinforcement consisting of the preform and densified by the matrix, and forming a single part with at least one of the following elements: flowpath delimiting inner platform portion and inner platform hooks or overhangs, and at least one of the following elements: flowpath delimiting outer platform portion and outer platform hooking legs; and
   assembling and connecting together a plurality of vanes to form a multi-vane turbine nozzle segment or compressor stator segment out of a composite material, the vanes being connected together by a process including a step selected from a brazing step and a step of connection by co-densification by a matrix of a plurality of vanes assembled together at an intermediary stage of densification,
   wherein the making of each vane comprises a step of partial densification of the preform by a matrix and a subsequent machining step, and the connection of a plurality of vanes together comprises assembling machined vanes together and co-densification by a matrix of the assembled machined vanes.

20. A method according to claim 19, wherein, when the turbine nozzle segment or compressor stator segment is made out of a ceramic matrix composite material, the assembling of the machined vanes together comprises a pre-ceramic bonding step.

21. A method according to claim 19, wherein, when the turbine nozzle segment or compressor stator segment is made out of a ceramic matrix composite material, the making of each vane comprises a first and a second step of densification by a ceramic matrix separated by a machining step, and the connection of a plurality of vanes together comprises a step of brazing together vanes assembled together after the second densification step.

22. A turbomachine blade or vane made of composite material comprising fiber reinforcement obtained by three-dimensional weaving of yarns and densified by a matrix, the blade or vane including a first portion constituting at least an airfoil exhibiting two faces each connecting a leading edge to a trailing edge,
   wherein the first portion forms a single part with at least one second portion present only on one of the faces of the airfoil, the second portion constituting a portion of at least one of the following elements: a flowpath delimiting outer portion of an inner platform, an inner portion of an inner platform, a flowpath delimiting inner portion of an outer platform, and an outer portion of an outer platform, the portions of the fiber reinforcement corresponding to the first and the second portions of the blade or vane being at least partially mutually imbricated, with yarns of the first portion of the fiber reinforcement penetrating into the second portion of the fiber reinforcement.

23. A turbomachine fitted with blades or vanes as claimed in claim 22.

24. A turbomachine blade made of composite material including a fiber reinforcement obtained by three-dimensional weaving of yarns and densified by a matrix, the blade including a first portion constituting an airfoil and a blade root, the blade airfoil exhibiting two faces each connecting a leading edge and a trailing edge,
   wherein said first portion forms a single part with at least one second portion present only on one of the faces of the blade airfoil, said second portion constituting a portion of at least one of the following elements: blade inner platform, blade anti-tilting wall, blade outer platform spoilers and blade outer platform wipers, the portions of the fiber reinforcement corresponding to the first and the second portions of the blade being at least partially mutually imbricated, with yarns of the first portion of the fiber reinforcement penetrating into the second portion of the fiber reinforcement.

25. A blade according to claim 24, wherein the second portion constitutes a portion of one of the following elements: blade inner platform, blade anti-tilting wall, blade outer platform spoilers and blade outer platform wipers and in that the first portion also forms a single part with at least one third portion constituting a portion of at least one of the said elements other than that already constituted by said second portion, said third portion being present only on one face of the airfoil,
   the portions of the fiber reinforcement corresponding to the first, second and third portions of the blade being at least partially mutually imbricated, with yarns of the first portion of the fiber reinforcement penetrating into the second and third portions of the fiber reinforcement.

26. A blade according to claim 25, wherein the first portion also forms a single part with at least one fourth portion constituting a portion of at least one of said elements other than that constituted by said second and third portions, said fourth portion being present only on one face of the airfoil,
   the portions of the fiber reinforcement corresponding to the first, second, third and fourth portions of the blade being at least partially mutually imbricated, with yarns of the first portion of the fiber reinforcement penetrating into the second, third and fourth portions of fiber reinforcement.

27. A blade according to claim 26, wherein the first portion also forms a single part with at least one fifth portion constituting a portion of at least one of said elements other than that constituted by said second, third and fourth portions, said fifth portion being present only on one face of the airfoil, the portions of the fiber reinforcement corresponding to the first, second, third fourth and fifth portions of the blade being at least partially mutually imbricated, with yarns of the first portion of the fiber reinforcement penetrating into the second, third, fourth and fifth portions of fiber reinforcement.

28. A blade according to claim 24, wherein the second portion constitutes a portion of one of the following elements: blade inner platform, blade anti-tilting wall, blade outer platform spoilers and blade outer platform wipers and in that the first portion forms a single part with at least one third portion constituting all or a portion of at least one of said elements other than that constituted by said second portion, the portions of the fiber reinforcement corresponding to the first, second and third portions of the blade being at least partially mutually imbricated, with yarns of the first portion of the fiber reinforcement penetrating into the second and third portions of the fiber reinforcement.

29. A turbomachine rotor or disk fitted with blades according to claim 24.

30. A turbomachine vane of composite material including a fiber reinforcement obtained by three-dimensional weaving of yarns and densified by a matrix, the vane including a first portion constituting an airfoil having two opposite faces, wherein the first portion forms a single part with at least a second portion present only on one of the faces of the vane airfoil, said second portion constituting a flowpath delimiting inner platform portion or inner platform hooks or overhangs, and at least a third portion present only on one face of the vane airfoil preform, said third portion constituting a flowpath delimiting outer platform portion or outer platform hooking legs, the portions of the fiber reinforcement corresponding to the first and the second portions of the vane being at least partially mutually imbricated, with yarns of the first portion of the fiber reinforcement penetrating into the second portion of the fiber reinforcement.

31. A turbine nozzle segment or a compressor stator segment comprising a plurality of vanes according to claim 30.

* * * * *